United States Patent [19]
Skaletzky et al.

[11] Patent Number: 5,784,108
[45] Date of Patent: Jul. 21, 1998

[54] APPARATUS FOR AND METHOD OF REDUCING THE MEMORY BANDWIDTH REQUIREMENTS OF A SYSTOLIC ARRAY

[75] Inventors: Gil Skaletzky, Karkur; Amir Freizeit, Ra'anana; Erez Sperling, Amikam; Michal Harlap, Tel Aviv; Moshe Steiner, Haifa, all of Israel

[73] Assignee: Zapex Technologies (Israel) Ltd., Netanya, Israel

[21] Appl. No.: 754,059

[22] Filed: Dec. 3, 1996

[51] Int. Cl.$^6$ .................................................. H04N 7/32
[52] U.S. Cl. ........................................ 348/415; 382/209
[58] Field of Search ................................. 345/502, 507; 348/415, 416; 382/232, 209

[56] References Cited

U.S. PATENT DOCUMENTS

| | | | |
|---|---|---|---|
| 5,594,813 | 1/1997 | Fandrianto et al. | 348/415 |
| 5,650,823 | 7/1997 | Ngai et al. | 348/415 |

*Primary Examiner*—Kee M. Tung
*Attorney, Agent, or Firm*—McDermott, Will & Emery

[57] ABSTRACT

A novel apparatus for and method of reducing the memory bandwidth required to process data located in a window is disclosed. The data located in the window is processed against known template data in accordance with a predetermined function or matching criteria. The criteria could be the best match between data in a given window of data, termed the search window, and data contained in a smaller size template block. The data in the search window is divided into smaller sized blocks. The template block is compared against each block in the search window in order to determine a best match. The invention is described in the context of a motion estimator within a video compression system but is applicable to other areas as well. The invention utilizes a plurality of processing elements and FIFO arrays arranged in a linear array to reduce the memory bandwidth required to process the data within the search window. Data from the search window is initially loaded into the processing elements and then rotated throughout in order to reduce memory accesses. In addition, the search window is traversed in a particular fashion so as to minimize the number of memory accesses required.

13 Claims, 15 Drawing Sheets

1

APPARATUS FOR AND METHOD OF REDUCING THE MEMORY BANDWIDTH REQUIREMENTS OF A SYSTOLIC ARRAY

FIELD OF THE INVENTION

The present invention relates generally to data processing devices and more particularly relates to processing data in a window against predetermined template data.

BACKGROUND OF THE INVENTION

It is common in video compression systems to require the movement of blocks of pixels to be estimated from one frame to the next. Rather than send the full frame of video information, only the deltas or movements, known as motion vectors, of the blocks of pixels need be sent. Video compression encoders perform such processing which results is a video bit rate greatly reduced form the original. Starting with the original initial frame, a video decoder can reconstruct the original frames by utilizing the motion vectors previously calculated for each of the blocks in the frame.

Video compression encoders currently exist but are generally large, expensive pieces of equipment. In line with the long term trend of manufacturing smaller and less expensive products, it would be very desirable to reduce the size, weight, cost and complexity of video compression encoders. In particular, the motion estimation portion of the video compression encoder would benefit a great deal if its size and cost were both reduced.

SUMMARY OF THE INVENTION

Accordingly, it is an object of the present invention to provide a system of processing data against a predetermined template that overcomes the disadvantages of the prior art.

It is another object of the present invention to provide a system of processing data in a predefined search window in order to find a best match between a smaller block of data and the data in the search window.

Another object of the present invention is to provide a system of processing data whereby the best match is determined using any suitable criteria which is a function of the data in the smaller block of data and the data in the search window.

Yet another object of the present invention is to provide a system of processing data whereby the number of memory accesses is minimized and the overall time to complete the search is reduced.

A novel apparatus for and method of reducing the memory bandwidth required to process data located in a window is disclosed. The data located in the window is processed against known template data in accordance with a predetermined function or matching criteria. The criteria could be the best match between data in a given window of data, termed the search window, and data contained in a smaller size template block. The data in the search window is divided into smaller sized blocks. The template block is compared against each block in the search window in order to determine a best match. The invention is described in the context of a motion estimator within a video compression system but is applicable to other areas as well. The invention utilizes a plurality of processing elements and FIFO arrays arranged in a linear array to reduce the memory bandwidth required to process the data within the search window. Data from the search window is initially loaded into the processing elements and then rotated throughout in order to reduce memory accesses. In addition, the search window is traversed in a particular fashion so as to minimize the number of memory accesses required.

There is thus provided in accordance with a preferred embodiment of the present invention an apparatus for reducing the memory bandwidth required to process data within a search window against predefined template data, comprising a plurality of processing elements, each processing element comprising a first search array shifter, the first search array shifter holding a block of data from the search window, the first search array shifter able to rotate its contents left and right and shift its contents up, a template block for holding a block of the predefined template data, function means coupled to the first search array shifter and to the template block, the function means for calculating a predetermined function based on the contents of the first search array shifter and the template block, a plurality of first in first out arrays (FIFOs), each FIFO comprising a second search array shifter, the second search array shifter holding a block of data from the search window, the second search array shifter able to rotate its contents left and right and shift its contents up, wherein the plurality of processing elements and the plurality of FIFOs are arranged adjacent one another in a linear array such that each first and second search array shifter is coupled to its left and right neighbor, search array shifters on either end of the linear array coupled to each other, wherein the search window data is shifted through the first and second search array shifters, on each successive shift the function means calculating the predetermined function, and wherein the search window is searched bidirectionally on a row by row basis whereby data within each row in the search window is rotated horizontally through the first and second search array shifters, at the end of each row, data in the first and second search array shifters is shifted vertically.

The apparatus further comprises an upper buffer coupled to the first and second search array shifters and to the search window, the upper buffer for buffering the contents of the search window. In addition, the apparatus further comprises a lower buffer coupled to the first and second search array shifters and to the search window, the lower buffer for buffering the contents of the search window.

The function means comprises a sum of the absolute difference generation unit and each of the first and second search array shifters comprises an array having dimensions 16×16, each the array containing data from the search window. Each of the template blocks comprises an array having dimensions 16×16, each the array containing template data.

There is also provided in accordance with a preferred embodiment of the present invention an apparatus for reducing the memory bandwidth required to process data within a search window against predefined template data, comprising a plurality of processing elements, each processing element comprising a first search array shifter, the first search array shifter holding a block of data from the search window, the first search array shifter able to rotate its contents left and right and shift its contents up and down, a template block for holding a block of the predefined template data, function means coupled to the first search array shifter and to the template block, the function means for calculating a predetermined function based on the contents of the first search array shifter and the template block, a plurality of first in first out arrays (FIFOs), each FIFO comprising a second search array shifter, the second search array shifter holding a block of data from the search window, the second search array shifter able to rotate its contents left and right and shift its contents up and down, wherein the plurality of processing elements and the plurality of FIFOs are arranged adjacent one another in a linear array such that each first and second search array shifter is coupled to its left and right neighbor, search array shifters on either end of the linear array coupled to each other, wherein the search window data is shifted through the first and second search array shifters, on each successive shift the function means calculating the predetermined function, and wherein the search window is searched bidirectionally on a row by row basis whereby data within each row in the search window is rotated horizontally through the first and second search array shifters, at the end of each row, data in the first and second search array shifters is shifted vertically.

Further, there is provided in accordance with a preferred embodiment of the present invention a method of processing data within a search window against predefined template data, the method for use in a processing array comprising template array means for storing the template data and search array shifter means, wider then the width of the template array means, for storing a portion of data from the search window, the processing including calculating a value which is a function of the template data and the search window data, the method comprising the steps of loading the template array means with the template data, loading the search array shifter means with a first load of the search window data, repeating the following steps until the last row of the search window is reached: calculating the function and rotating the data within the search array shifter means one position to the left, repeating this step of calculating and rotating until the end of the current row of data is reached, shifting the search array shifter means up one position and loading the next row of data from the search window, calculating the function and rotating the search array shifter means one position to the right, repeating this step of calculating and rotating until the end of the current row of data is reached, and shifting the search array shifter means up one position and loading the next row of data from the search window.

BRIEF DESCRIPTION OF THE DRAWINGS

The invention is herein described, by way of example only, with reference to the accompanying drawings, wherein.

DETAILED DESCRIPTION OF THE INVENTION

As stated previously, video compression is currently being used in a wide variety of applications. Video compression standards such as the MPEG 2 standard define the output specifications of video encoders. Video encoders functions to compress the video stream from its relatively large original bandwidth to a much smaller bandwidth. The encoded video stream can then be transmitted onto a communication channel or stored in a storage medium, for example. In either case, the bandwidth requirements of the communications channel are greatly reduced and the amount of storage required to hold the video program is also greatly reduced. The encoding of a video stream, in the MPEG 2 standard, for example, requires estimating the changes in the motion between consecutive frames. This process is termed motion estimation. A more in depth discussion of the motion estimation process can be found in "Image and Video Compression Standards, Algorithms and Architectures," by Vasudev Bhaskaran and Konstantinas Konstantinides, Chapter 11, which is incorporated herein by reference.

First, the frame is broken up into blocks of pixels, 16 by 16 pixels large, for example, and then for each block in the current frame, the best matching block in the previous frame is found. Rather than transmit the same block over again in full, the change in the position (i.e., the movement) of the block from the previous frame to the current frame is sent instead, greatly reducing the data needed to be transmitted.

The present invention embodying an apparatus for and a method of searching for data in a search area is disclosed and described within the context of a video compression system. This, however, in no way limits the application of the present invention to other areas as well. The present invention is applicable in any type of system that requires processing (e.g., finding a best match) of a relatively small template of data against a larger sized search window. In addition, the calculation criteria can be anything that is a function of the data within the template of data and the data in the search window (e.g., choosing the best match).

Figure 1:
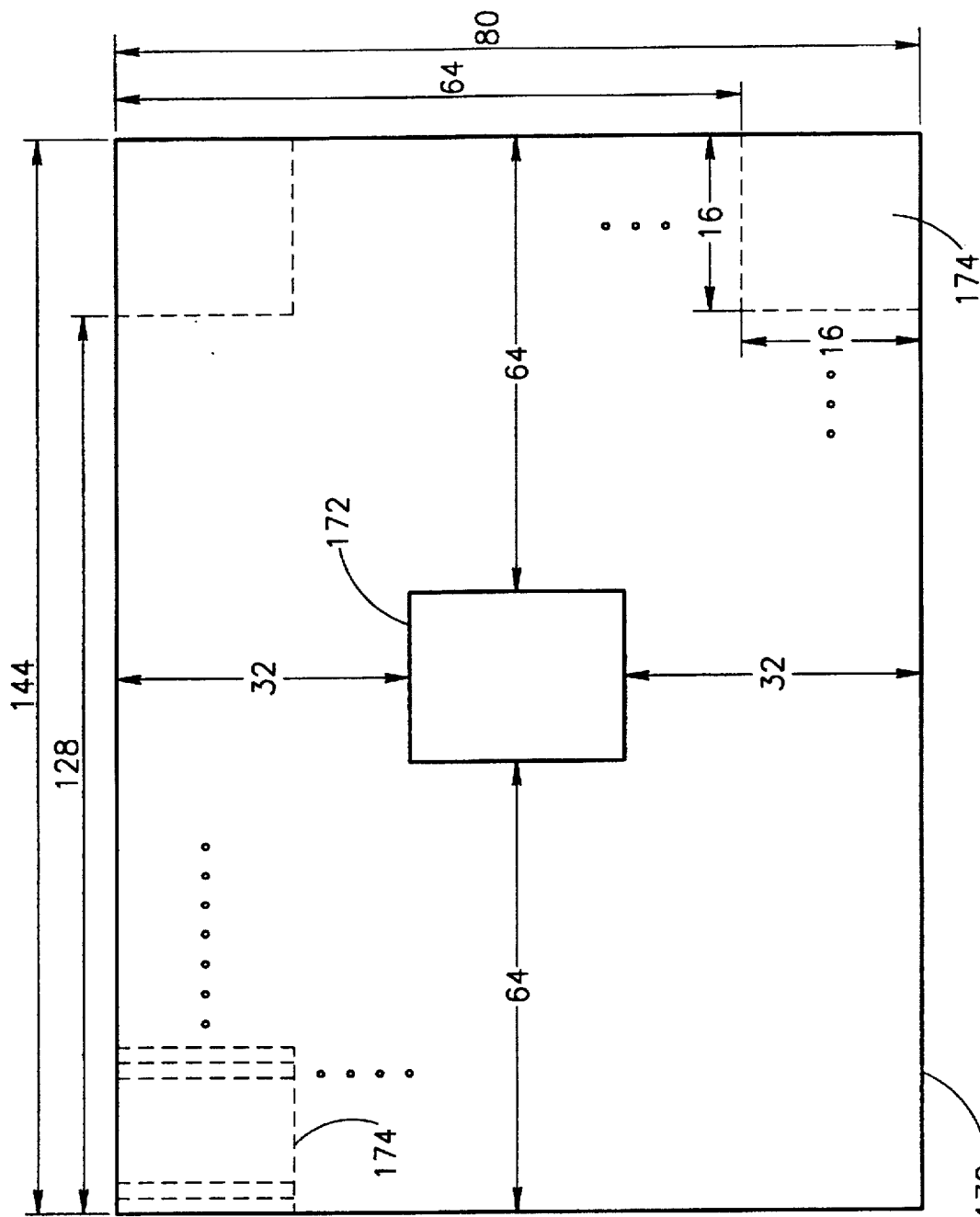
FIG. 1 illustrates an example template macro block within a search window of size 128×64.

The example video compression scheme presented herein utilizes a motion estimation method which uses a search window having a particular size. Each block of pixels, termed a template macro block, in the current frame is compared against each block within the search window which contains data from the previous frame. Typically, the search window is a subset of the frame area rather than the entire frame since it is not likely that objects move very far from one frame to the next. Using a reduced search window reduces the computation time needed to find the best matching block. An example template macro block shown within a search window of size 128×64 is illustrated in FIG. 1. The search window 170 comprises a plurality of blocks 174 each 16×16 pixels. The block 172 shown in the center of the search window represents the template macro block to be matched. In this example, the search window is 9 block by 5 blocks or 144 pixels by 80 pixels. The data in the search window is processed on a block by block basis. The search begins in the upper left corner as indicated by the dashed box. The matching function is performed on the block in the upper left corner. Then, the block is shifted right by one pixel and the matching function is performed again. This process is repeated pixel by pixel until the end of the first row of pixels is reached. The last block processed is indicated by the dashed rectangle shown in the upper right corner of the search window. It is important to note that the actual number of matches searched is 128 and not 144. The block is then shifted down one pixel row and the process continued. Similarly, only 64 matches and not 80 are searched in the Y direction. Thus, out of a search window of size 9×5 blocks or 144×80 pixels, the search window actually searched is 8×4 blocks or 128×64 matches.

In light of the above description it is noted that in order to search, for example, 32 pixels on either side of a block, requires a search window 32+32+1 or 65 pixels wide. This is due to 32 pixels to the left, 32 pixels to the right and the pixel in the search window corresponding to the template block itself unmoved. A search window 64 pixels wide can handle a search −32 to +31 pixels wide. However, to aid in understanding the concepts of the present invention, the examples presented do not consider the single pixel corresponding top the template block unmoved.

Figure 2:
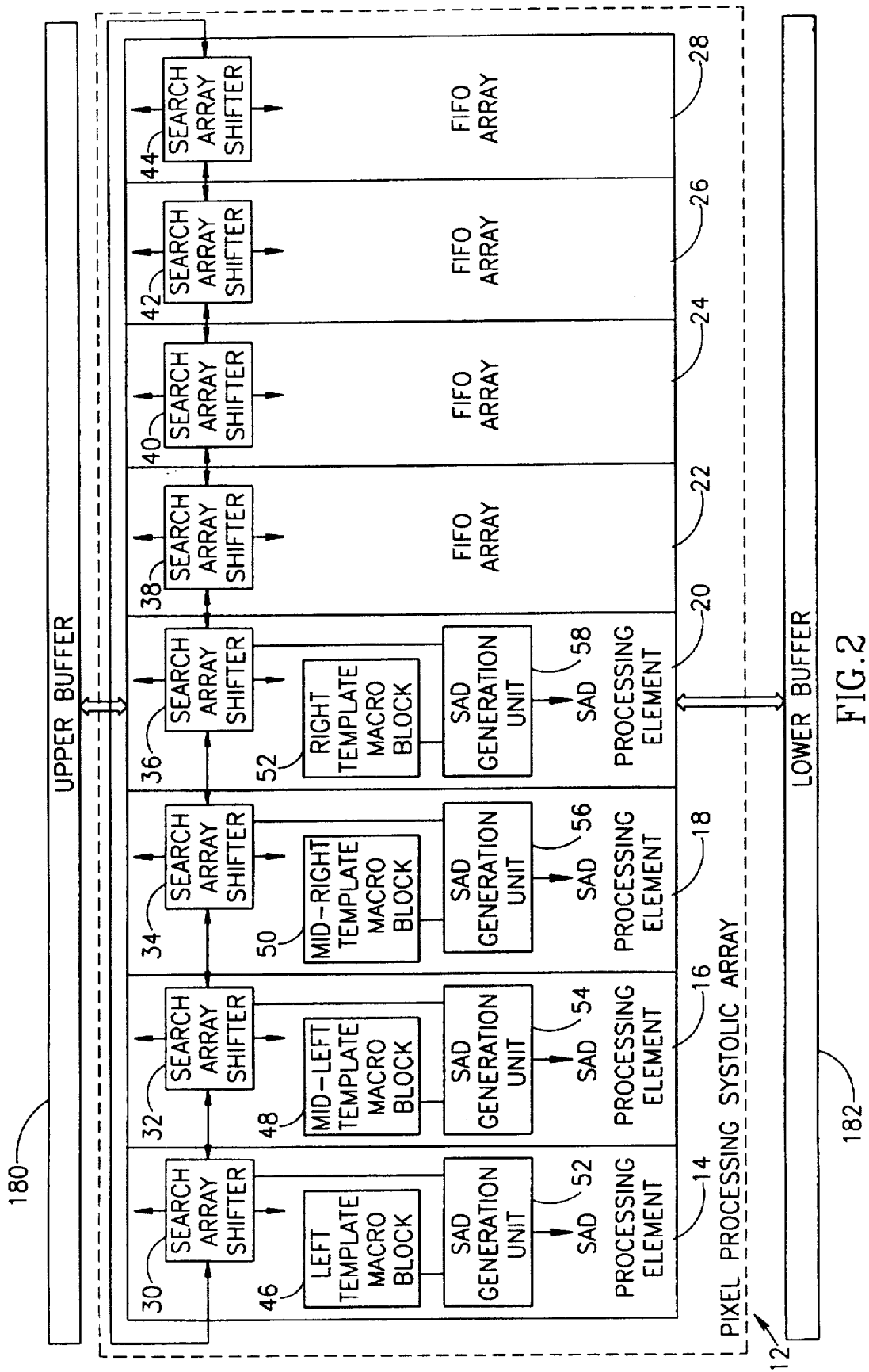
FIG. 2 is a high level block diagram illustrating the pixel processing systolic array constructed in accordance with a preferred embodiment of the present invention.

The actual matching function between the template macro block and the search window data is performed using a systolic array. In a preferred embodiment, the systolic array processes four template macro blocks at a time for speed and efficiency purposes. A high level block diagram illustrating the pixel processing systolic array 12 constructed in accordance with a preferred embodiment of the present invention is shown in FIG. 2. The systolic processing array 12 comprises four processing elements 14, 16, 18, 20 and four first in first out (FIFO) arrays 22, 24, 26, 28. Each processing element 14, 16, 18, 20 comprises a search window data array 30, 32, 34, 36, respectively, and a sum of the absolute differences (SAD) generation unit 52, 54, 56, 58, respectively. Processing elements 14, 16, 18, 20 also comprise a left template macro block 46, mid-left template macro block 48, mid-right template macro block 50 and a right template macro block 52, respectively. Each search array shifter 30, 32, 34, 36 and template macro block 46, 48, 50, 52 is coupled to SAD generation unit 52, 54, 56, 58, respectively. In addition, each search array shifter 32, 34, 36, 38, 40, 42, is coupled to its neighboring search array shifter to its left and right. Search array shifter 30 is coupled to the search array shifter 32 to its right and to search window 44. Search array shifter 44 is also coupled to the search array shifter 42 to its left. All the links coupling the search array shifters are bi-directional links.

The search array shifters hold the data from previous frames that is to be compared to data in the current frame. Each search array shifter is 16×16 pixels. The template macro blocks are also arrays 16×16 pixels large. Each template macro block holds one block of pixel data from the current frame. As stated previously, the best match is found by finding the block in the search window that yields the minimum SAD. The minimum SAD function is performed by the SAD generation units. Each SAD generation unit receives a block of pixels from the search array shifter and a block of pixels from the template macro block. The SAD generation unit computes the absolute difference between each of the pixel blocks in pair wise fashion, meaning the difference between the values of the first, second, third, etc. pixels of both the search array shifter and the template macro block are computed. In the preferred embodiment, the SAD generation unit computes the difference between 256 pairs of pixel values. The absolute value of the differences are then summed to yield a total SAD result. The current SAD result is then compared to the current minimum SAD and if the new SAD is smaller it is then made the new current minimum SAD.

Each template macro block (i.e., left, mid-left, mid-right and right) comprises an array 16×16 pixels large. Each template macro block has an interface to template memory means that stores the pixel data for the current frame. At the beginning of operation, pixels making up the frame are transferred via the template memory means to the template macro blocks a portion at a time.

Each search array shifter comprises an array 16×16 pixels large. The search array shifters have an interface to an upper buffer 180 and a lower buffer 182 both coupled to the systolic array 12. Search window memory means holds the search window pixel data. As the search window is searched, data is transferred row by row from the search window memory to either the upper or lower buffer, depending on the direction of the search. All the search array shifters in the systolic array have means for shifting pixels one by one to and from both the upper buffer 180 and the lower buffer 182 as represented by the up and down arrows emanating from each search array shifter block. In addition, each search array shifter can be shifted left and right by one pixel. As the search window is scanned, the data in the search window is shifted by one pixel, either to the left, right, up or down in accordance with the search algorithm described infra.

The process of generating a SAD result is well known in the art and is not described in detail here. A detailed description of a SAD generator suitable for use in the present invention is disclosed in application Ser. No. 08/740,046, entitled A SUM OF THE ABSOLUTE VALUES GENERATOR, similarly assigned.

The present invention requires at least one processing element and at least one FIFO array. However, performance can be improved by adding additional processing elements and/or FIFO arrays. In the example presented in FIG. 2, four processing elements and four FIFO arrays are utilized. The additional processing elements and/or FIFO arrays may be necessary for speed and efficiency purposes in cases where very high speed processing is required. The four FIFOs function to hold pixel data from neighboring search window blocks thus greatly reducing the memory bandwidth needed to process the current set of template macro block data. Similarly, four template macro blocks are processed simultaneously for speed purposes. The decision as to the number of FIFO arrays to use is a function of the desired reduction in memory bandwidth. Using additional FIFOs reduces the number of required memory accesses but increases the amount and complexity of the hardware required. Using fewer FIFO arrays reduces hardware requirements but increases the required memory frequency or decreases the access time needed, thus increasing the total processing required. Likewise, systolic arrays having a larger or smaller number of processing elements are possible. Less processing elements increase the processing time and more processing elements decrease the processing time.

The relationship between the number of processing elements, FIFO arrays, memory bus width and other variable factors is expressed mathematically as follows:

$$F_e = \frac{N \cdot F_i}{BW \cdot (N - i \cdot M + 1)}$$

where $$N \geq i \cdot M$$

i=1,2,3 . . .
and where
- N=number of columns within the processing elements and FIFO arrays combined
- M=width of a macro block in number of columns of pixels
- BW=width of the memory bus in pixels
- $F_i$=internal frequency
- $F_e$=frequency of external memory
- i=number of processing elements Examining the above relationship, one can see that if $$N = i \cdot M$$

then $$F_e = \frac{1}{BW} \cdot i \cdot M \cdot F_i$$

In other words, if the number of total columns is set equal to the number of columns in the processing elements (i.e., no FIFOs) the required external memory frequency is related to the number of processing elements multiplied by the internal frequency. On the other hand, if $$N \rightarrow \infty$$

then $$F_e \approx \frac{1}{BW} \cdot F_i$$

Thus, as the number of total columns increases (i.e., the number of FIFOs increases while the number of processing elements remains fixed) the required external memory frequency is reduced by a factor of 1/BW.

As stated previously, the present invention functions to minimize the external memory frequency $F_e$. As an illustration of the effectiveness of the present invention the following two example cases are considered:

Case #1: No FIFO arrays
  N=64 columns of pixels
  M=16 columns of pixels per array
  BW=4 pixels @ 8 bits/pixel=32 bits
  $F_i$=100 MHz
  i=4 processing arrays Note that this case does not include any FIFOs and is being presented for illustrative purposes only. The relationship given above yields:

$$F_e = \frac{1}{4} \cdot \frac{64 \cdot 100}{64 - 64 + 1}$$
$$= 1600 \text{ MHz}$$

Case #2: Four FIFO arrays
  N=128 columns of pixels
  M=16 columns of pixels per array
  BW=4 pixels @ 8 bits/pixel=32 bits
  $F_i$=100 MHz
  I=4 arrays The only difference in Case #2 is that four FIFOs of width 16 pixels each have been combined with the four processing elements. The relationship now yields:

$$F_e = \frac{1}{4} \cdot \frac{128 \cdot 100}{128 - 64 + 1}$$
$$= 50 \text{ MHz}$$

Thus, the external memory frequency $F_e$ has been reduced by a factor of 32 by the addition of the four FIFO arrays as compared to the case with no FIFO arrays at all. Adding additional FIFO arrays yield an even higher reduction in the required external memory frequency.

As stated previously, the search array shifters are coupled to each other so that pixel blocks can be rotated left and right from one search array shifter to another. The purpose of the FIFO arrays is to serve as a buffer holding blocks of pixels that are to be matched against the template macro block data. As the search window is scanned, pixel data in the search window is loaded into the search array shifters in the systolic array.

Figure 3:
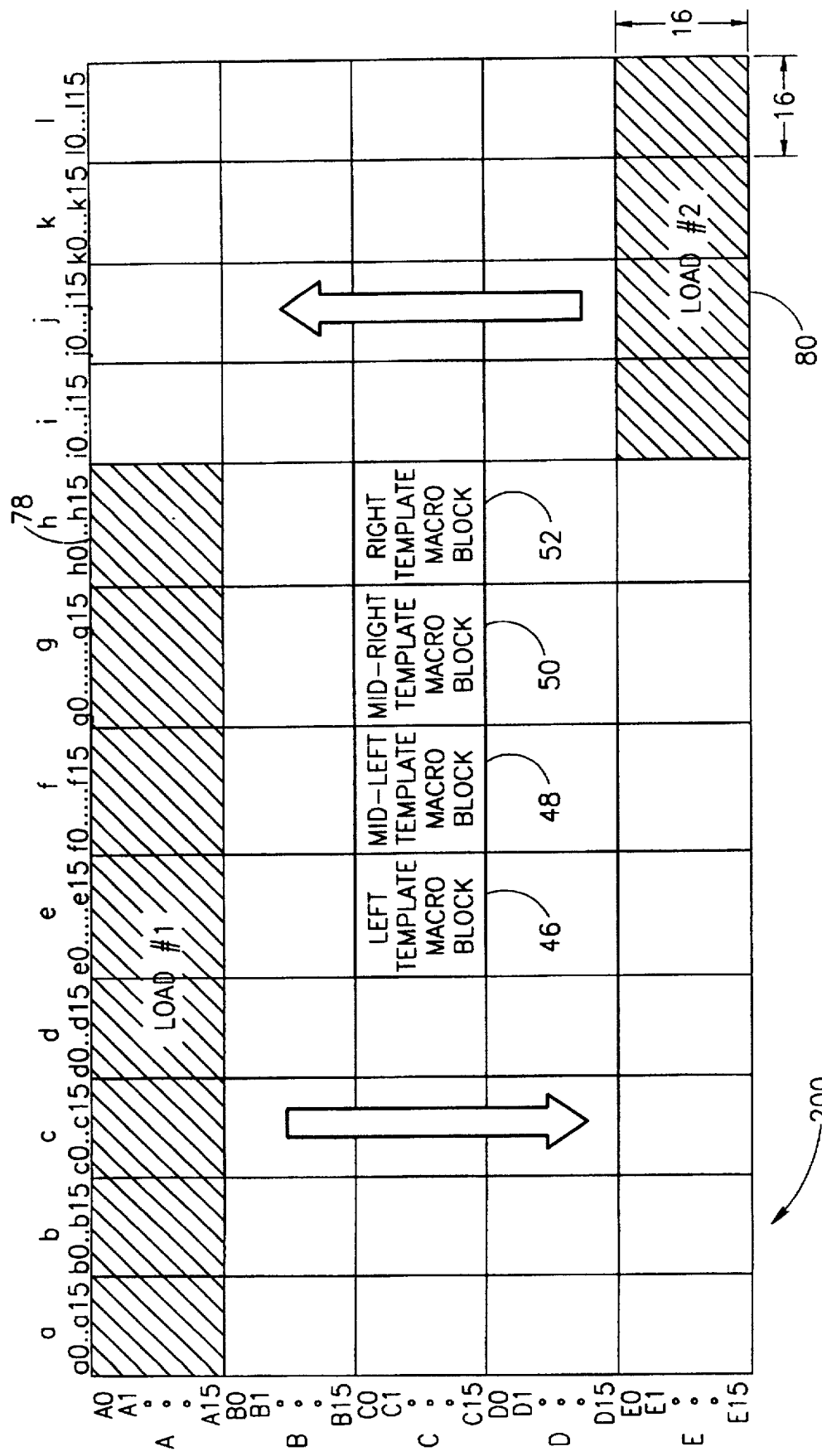
FIG. 3 illustrates four template macro blocks relative to the search window, the portions of the search window that are explicitly loaded into the search array shifters and the direction of the search in a preferred embodiment.

To aid in better understanding the method of the present invention, an illustration of four template macro blocks, the portions of the search window that are explicitly loaded into the search array shifters and the direction of the search performed in a preferred embodiment are shown in FIG. 3. The template macro blocks 46, 48, 50, 52 (FIG. 2) are shown superimposed onto the search window 200 in order to illustrate the dimension requirements of the search window. The search window 200 that is used to match against the four template macro blocks: left 46, mid-left 48, mid-right 50 and right 52, is an array of blocks 12×5. The rows of blocks of the search window 200 are represented as block rows 'A' through 'E,' with each row having 16 rows of pixels (e.g., A0, A1 through A15). The columns of blocks are represented as block columns 'a' through 'l'. Each block column has 16 pixel columns labeled a0 through a15 for column 'a,' for example. Not every block in the search window is matched against all the template macro blocks. Each template macro block is searched against a sub-window of 9×5 blocks. Thus, the left template macro block 46 is searched against the sub-window comprising blocks in columns 'a' through 'i' of rows A through E. The mid-left template macro block 48 is searched against the sub-window comprising blocks in columns 'b' through 'j' of rows A through E. The mid-right template macro block 50 is searched against the sub-window comprising blocks in columns 'c' through 'k' of rows A through E. The right template macro block 52 is searched against the sub-window comprising blocks in columns 'd' through 'l' of rows A through E.

In a preferred embodiment, the loading of each row of data into the upper and lower buffers and the shifting of pixel from array to array occurs simultaneously with the SAD calculation. However, a load is required initially without processing occurring simultaneously. Before processing can begin, the search window shifters in the processing elements and the FIFOs must be filled with pixel data. In addition, there is a second load that is required to be performed without simultaneous processing occurring when the search algorithm reaches the bottom of the search window.

In the initial load, referred to as LOAD #1 in FIG. 3, the pixel data in the blocks in columns 'a' though 'h' in row A is loaded into the search array shifters 30, 32, 34, 36, 38, 40, 42, 44, respectively, in the systolic array (FIG. 2). The search window is scanned in a downward direction until row E is reached whereby the second load, labeled LOAD #2 in the Figure, is then made. The search proceeds from there in an upward direction until row A is reached. The large arrows in the Figure indicate the direction of the scanning for each of the loads.

As the search window is scanned, pixel data from the following row is loaded into the systolic array after all the pixels in the current row have been processed. Within each row, the pixel data is shifted left or right through the systolic array in accordance with the search algorithm.

The search algorithm will now be described in more detail. The method of the present invention may be implemented using a variety of well known techniques. Preferably, the method is implemented using pipelining techniques to maximize throughput and minimize delays. Thus, although the various steps described below are presented in a sequential manner, they may be implemented using pipelining, permitting them to be performed in parallel.

Figure 4A:
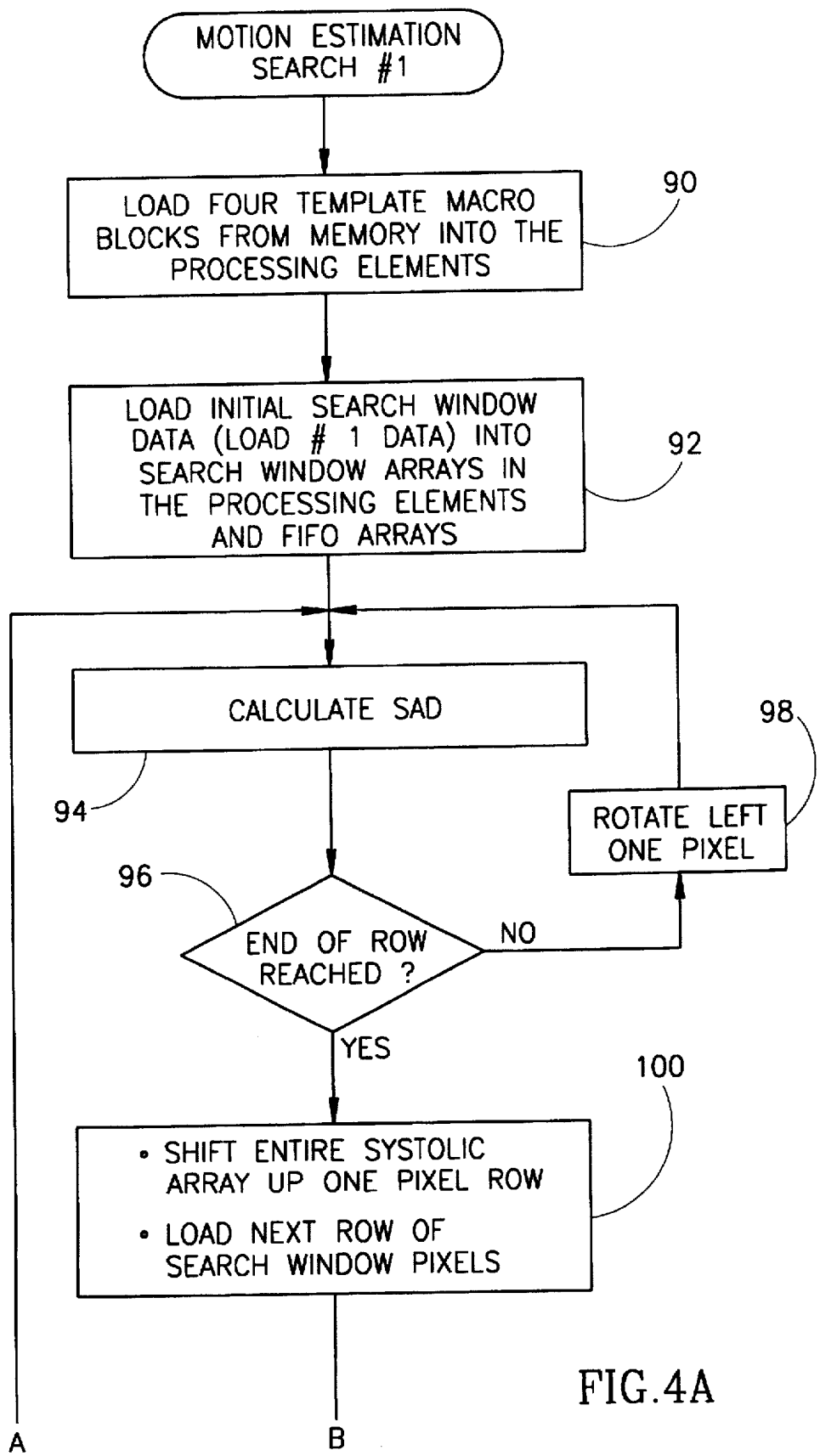
FIGS. 4A–4C are a high level flow diagram illustrating the method of performing the motion estimation search within the search window in a preferred embodiment of the present invention.
Figure 4B:
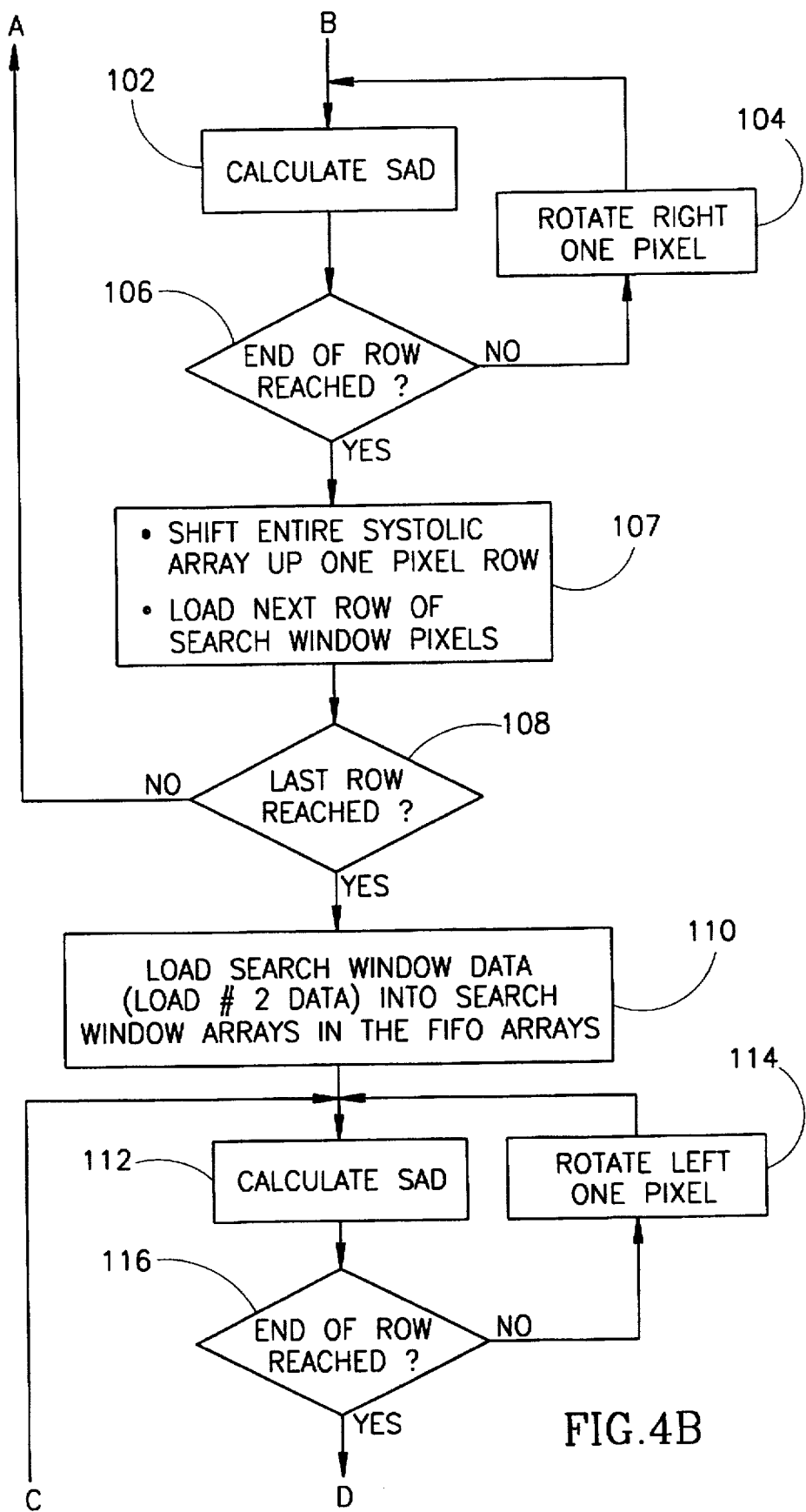
Figure 4C:
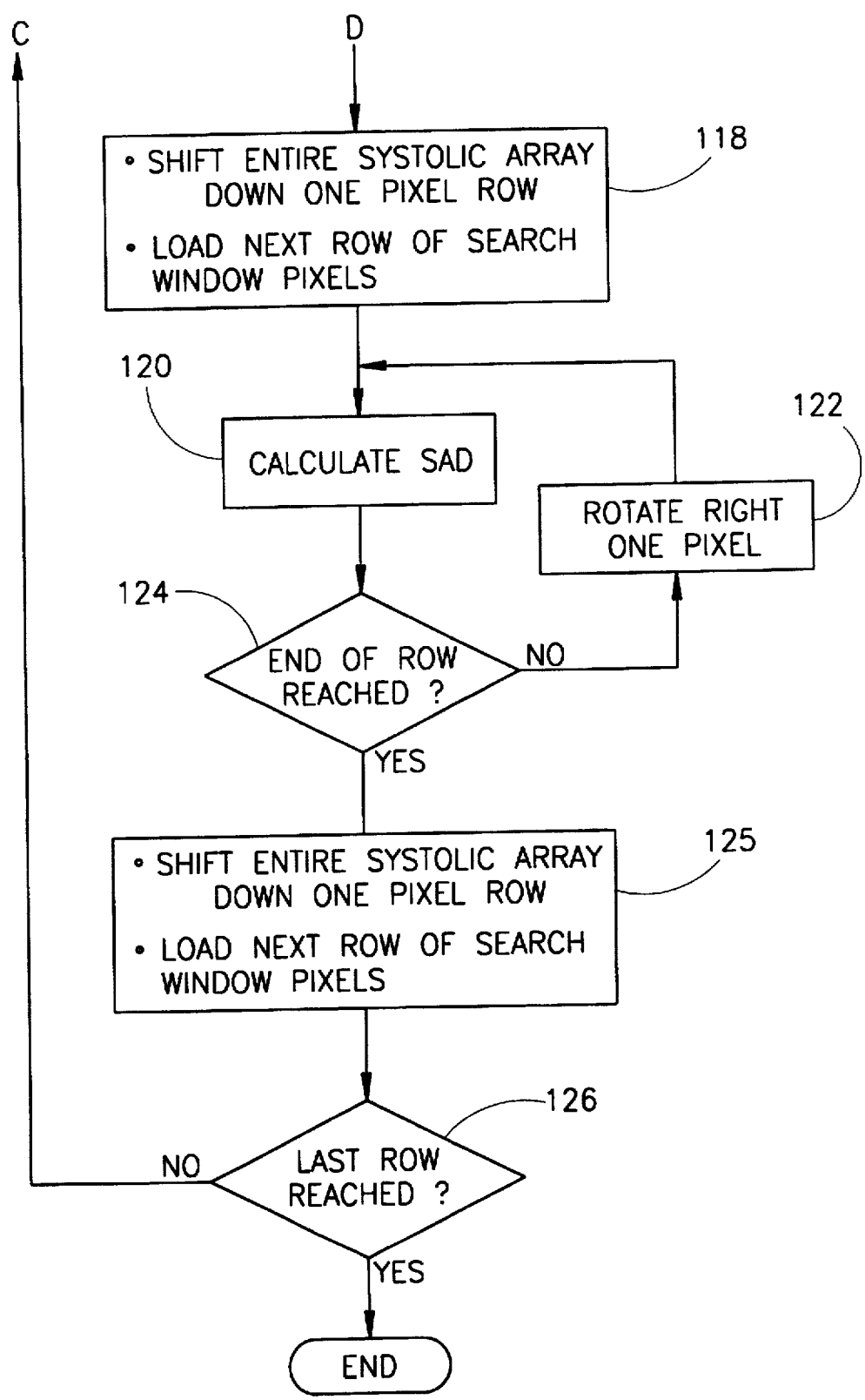

A high level flow diagram illustrating the preferred method of performing the motion estimation search within the search window is shown in FIG. 4. The first step is to load the four template macro blocks 46, 48, 50, 52 with pixel data from memory holding the current frame (step 90). Next, the search array shifters 30, 32, 34, 36 in the processing elements 14, 16, 18, 20 and search array shifters 38, 40, 42, 44 in the FIFO arrays 22, 24, 26, 28 in the systolic array 12 (FIG. 2) are loaded with pixel data from the previous frame (i.e., the data that is to be searched) (step 92). The data that is loaded is indicated by the hatched LOAD #1 area in FIG. 3 and comprises the pixel data in columns 'a0' through 'h15' in block row A (i.e., rows A0 through A15). Once the search array shifters and the template macro blocks are loaded, the first SAD can be generated by each of the four SAD generation units in the processing elements (step 94). Note that the four SAD generation units calculated a SAD value only for four blocks, i.e., rows A0 through A15 and columns a0 through d15. After the four SAD generation units calculate a SAD values for their respective template macro blocks, the data in the search array shifters in the systolic array is rotated left by one pixel (step 98). In this step, the pixels in the leftmost column of search array shifter 30 wrap around, i.e., are rotated left into the rightmost column in search array shifter 44 such that the data in the search array shifters, from left to right, represent the pixel data in rows A0 through A15 and columns a1, a2 . . . h14, h15, a0.

Once the pixels are rotated, each of the four SAD generation units calculate a SAD value using the template macro block data and the data in rows A0 through A15 and columns a1 through e0. The SAD result in the current cycle is then compared to the current minimum SAD. If the currently generated SAD is less than the minimum, the current SAD is made the new minimum SAD. Once the second SAD calculation is complete, the data in the search array shifters is again rotated left one pixel so that the data in the search array shifters in the systolic array represents pixel data in columns a2, a3 . . . h13, h14, a0, a1, read from left to right.

This entire process repeats until the data originally in the leftmost column of the search array shifter 38 reaches the leftmost column in search array shifter 30 signifying that the end of the current row has been reached (step 96). This occurs after 64 rotate and calculate cycles. At this point, the SAD has been calculated for the eight blocks row A column 'a' through 'h'. For each of the template macro blocks, four blocks have been processed. The left template macro block has been processed with the pixels in columns 'a' through 'e', the mid-left template macro block with the pixels in columns 'b' through 'f', the mid-right template macro block with the pixels in columns 'c' through 'g', the right template macro block with the pixels in columns 'd' through 'h'.

Once the end of the first row is reached, all the search array shifters are shifted up one pixel. Then a new row of pixels, row B0, is shifted into the search array shifters and the top row, row A0, is shifted out and discarded (step 100). Thus, the search array shifters contain, from left to right, the pixel data in rows A1 through B0 and columns e0, e1 . . . h15, a0 . . . e15.

The process then continues in similar fashion to the steps described above. The steps include first calculating the SAD for the data currently in the search array shifters within the processing elements, i.e., columns e0 through h15 (step 102). Then the search array shifters in the systolic array is rotated right by one pixel (step 104). The column of pixels in the rightmost column of search array shifter 44 is rotated to the leftmost column of search array shifter 30. At this point, the pixel data in the search array shifters represents rows A1 through B0 and columns d15, e0 . . . h15, a0 . . . d13, d14. The SAD is then calculated for columns d15 through e14. The steps of calculating the SAD and rotating right repeat until the end of the row is reached (step 106). At this point, the data in the search array shifters, from left to right, represent columns a0 through h15. The search window arrays are again shifted up one pixel and the data from row A1 is discarded and the data from row B1 is loaded into the search array shifters.

The process described above repeats until the last row, E15, is reached (step 108). The search window is traversed from left to right then down then right to left then down, etc. The last row, E15, is loaded at the point when the search array shifters in the processing elements contain data from columns a0 though d15. After 64 rotates to the left, the search array shifters are left with data from columns e0 through h15 and rows E0 through E15. At this point, a second load of data, hatched LOAD #2 area in the Figure, is made. The data in the LOAD #2 area is loaded into the search array shifters 38, 40, 42, 44 within the FIFOs 22, 24, 26, 28, respectively (step 110).

The SAD is then calculated using search window pixel data in columns e0 through h15 and rows E0 through E15 (step 112). After the SAD is calculated, the data in the search array shifters are rotated to the left one pixel (step 114). These steps are repeated 64 times until the data in the search array shifters in the processing elements corresponds to the pixel data in columns i0 through l15. At the end of the first row of processing the left template macro block has been processed with the pixels in columns 'e' through 'i', the mid-left template macro block with the pixels in columns 'f' through 'j', the mid-right template macro block with the pixels in columns 'g' through 'k', the right template macro block with the pixels in columns 'h' through 'l'.

Once the end of the first row of pixels is reached (step 116), all the search array shifters in the systolic array are shifted down one pixel, discarding the pixel data from row E15 (step 118). The pixel data in row D15 columns e0 through l15 are loaded into the search array shifters. The search array shifters in the processing elements now hold data corresponding to rows D15 through E14 and columns i0 through l15. The SAD is then calculated (step 120) and the search array shifters are rotated right one pixel (step 122). These steps of calculating the SAD and rotating right one pixel are repeated for 64 cycles until the end of row D15 is reached (step 124).

At this point, the pixel data from row E14 is discarded, the search array shifters shift down one pixel and the pixel data in row D14 is loaded into the search array shifters. The process of calculating and rotating continues in the direction of the large arrow adjacent to the LOAD #2 area in the Figure until the last row, row A0, is reached (step 126). After the pixel data from row A0 is processed, the search array shifters in the processing elements are left holding pixel data from rows A0 through A15 and columns i0 through l15.

The preferred method of searching just described, is very efficient and requires a minimal number of memory accesses. The second load of data occurs at the bottom corner of the search window so as to make efficient use of the data remaining in the search array shifters within the processing elements at that time. Note that the second load only requires four blocks of data to be loaded rather than eight as in the first load. This is due to the fact that the data needed is already in the search array shifters. In addition, the traversing pattern of searching in conjunction with the use of the FIFO arrays further minimizes the number of memory accesses that are required. Shifts and rotates between the arrays are usually much faster than memory accesses.

Figure 5:
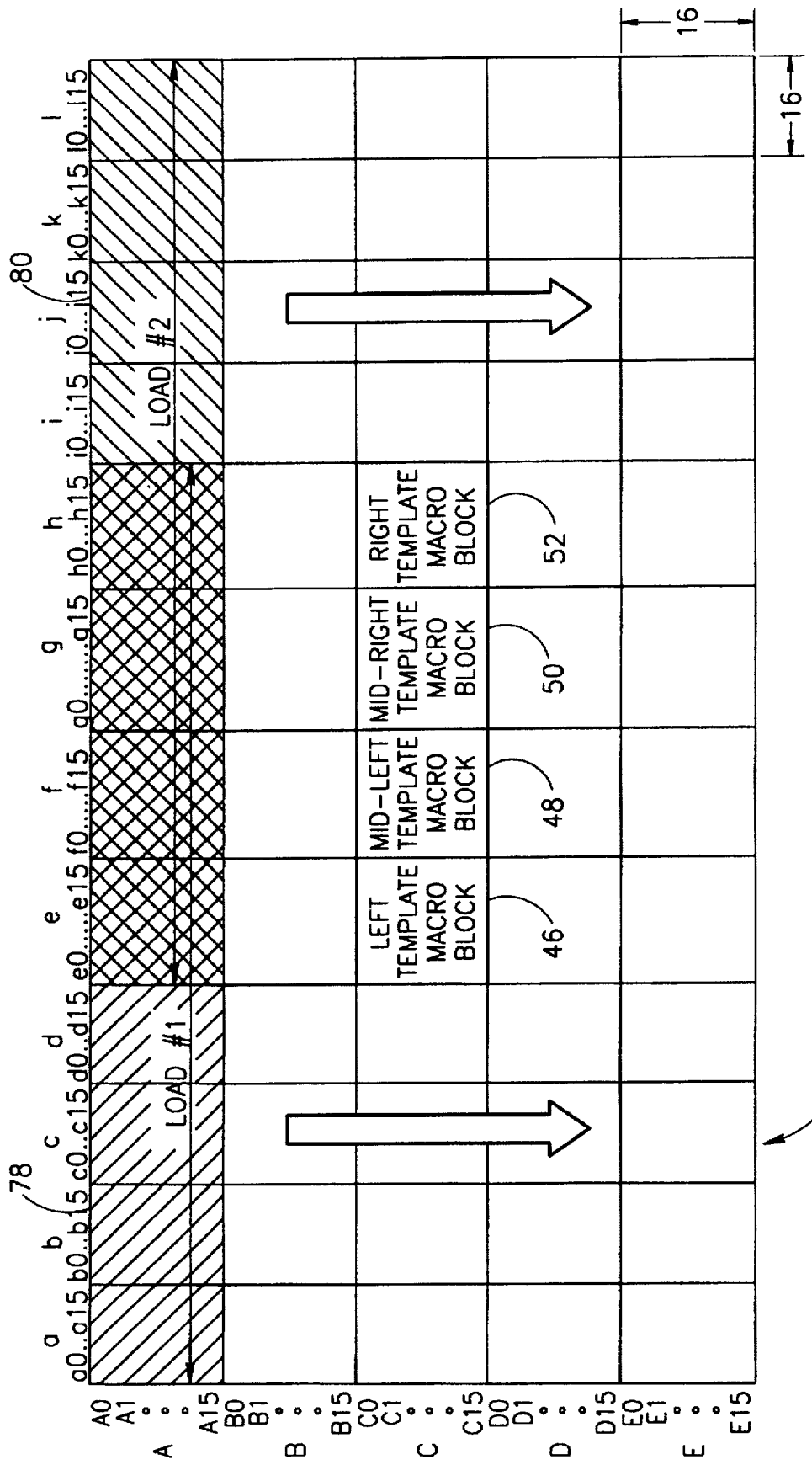
FIG. 5 illustrates four template macro blocks relative to the search window, the portions of the search window that are explicitly loaded into the search array shifters and the direction of the search in an alternative embodiment.

In an alternative embodiment the second load may occur whereby the pixel data from eight blocks from the top corner of the search window is loaded into the search array shifters in the systolic array. FIG. 5 illustrates the relative position of the four template macro blocks within the search window, the portions of the search window that are explicitly loaded into the pixel processing systolic array and the direction of the search in an alternative embodiment. The first load, i.e., LOAD #1 78, loads in the eight blocks of pixel data in row A columns 'a' through 'h'. However, the second load, i.e., LOAD #2 80, loads in pixel data from row A columns 'e' through 'l'. This alternative embodiment is less efficient in terms of speed and efficiency since 16 blocks of pixel data needs to be loaded rather than 12. However, it is more efficient in terms of hardware because it requires only three and not four directions of shifting capability.

Figure 6A:
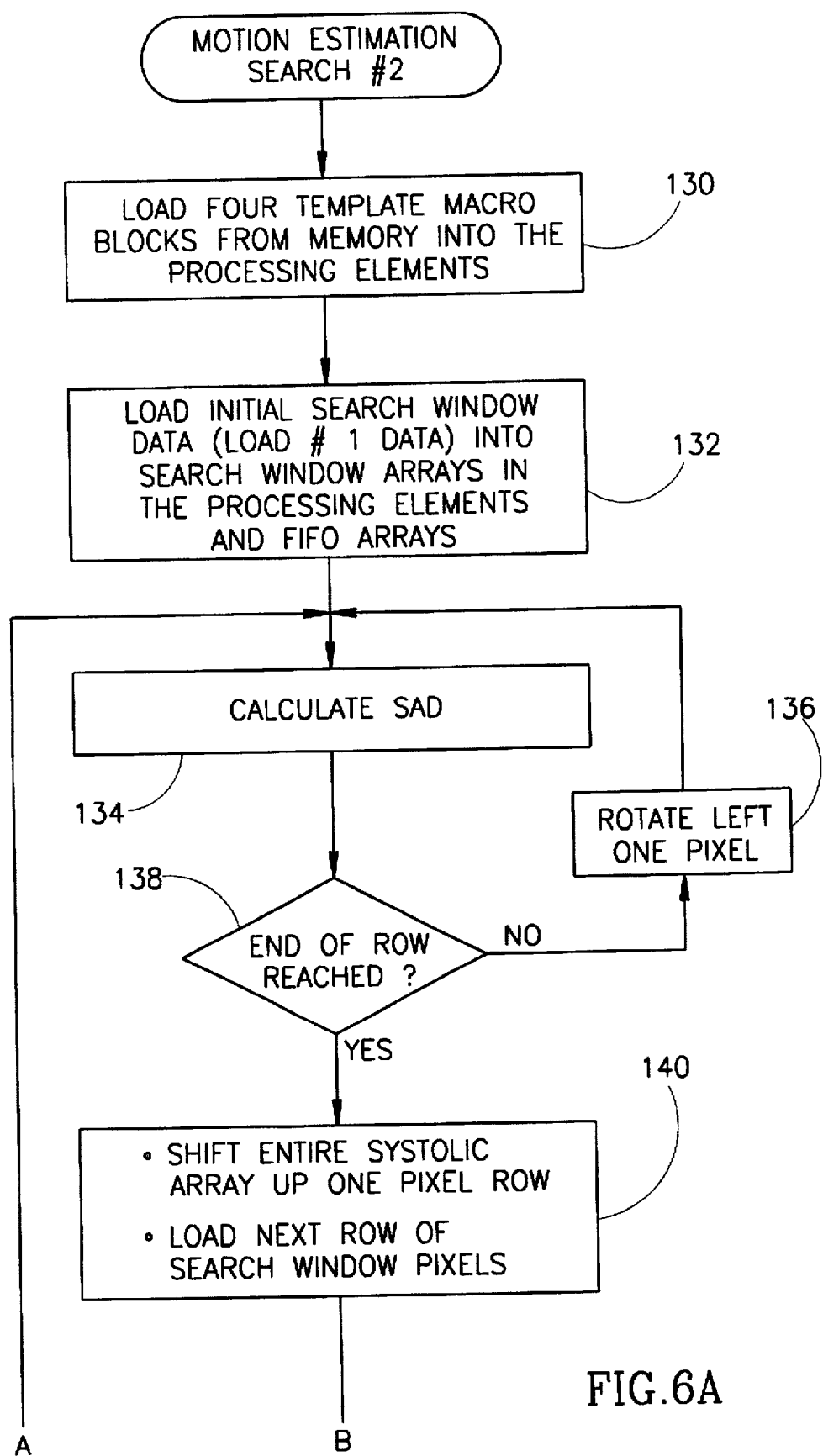
FIGS. 6A–6C are a high level flow diagram illustrating the method of performing the motion estimation search within the search window in an alternative embodiment of the present invention.
Figure 6B:
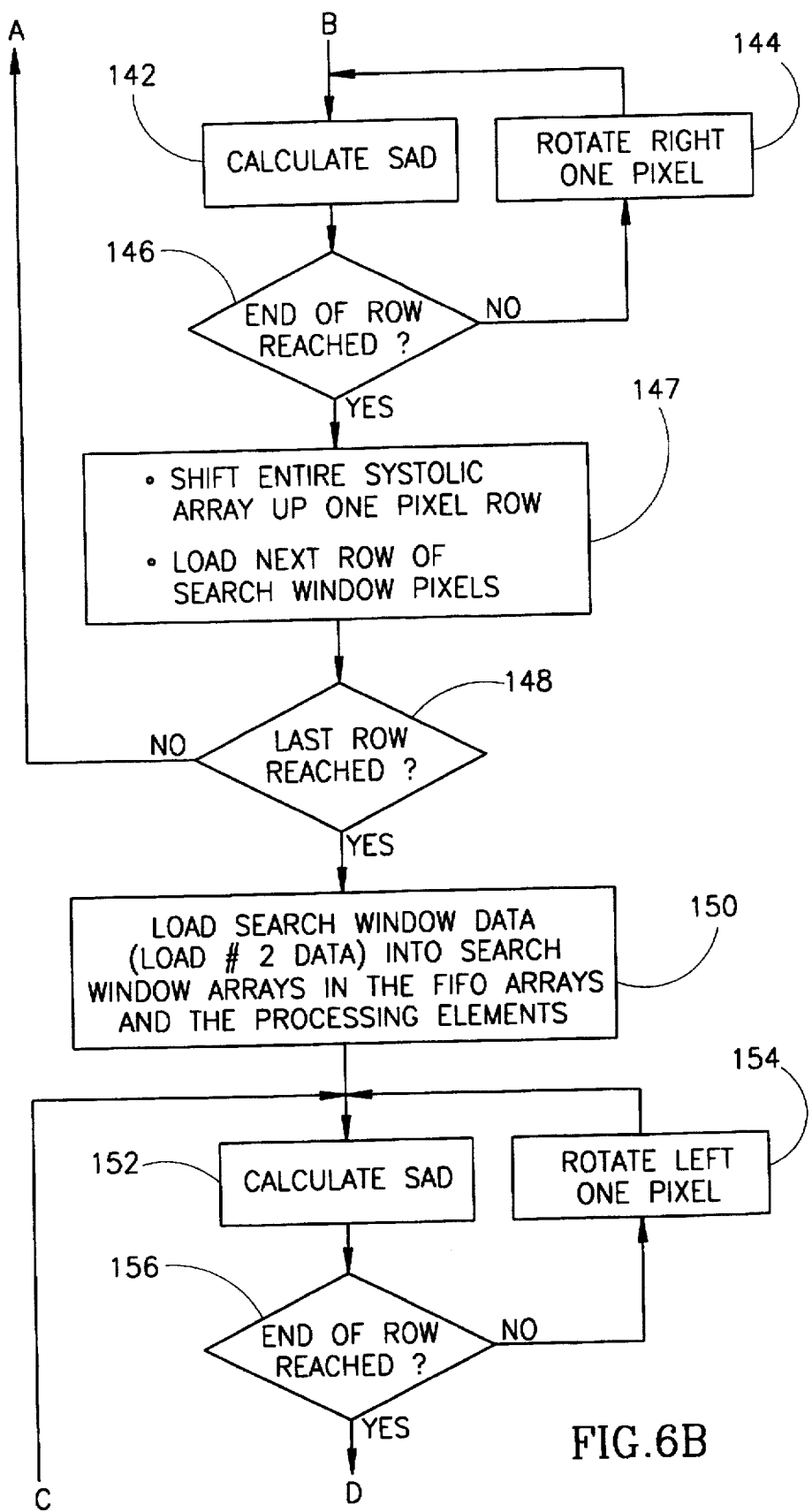
Figure 6C:
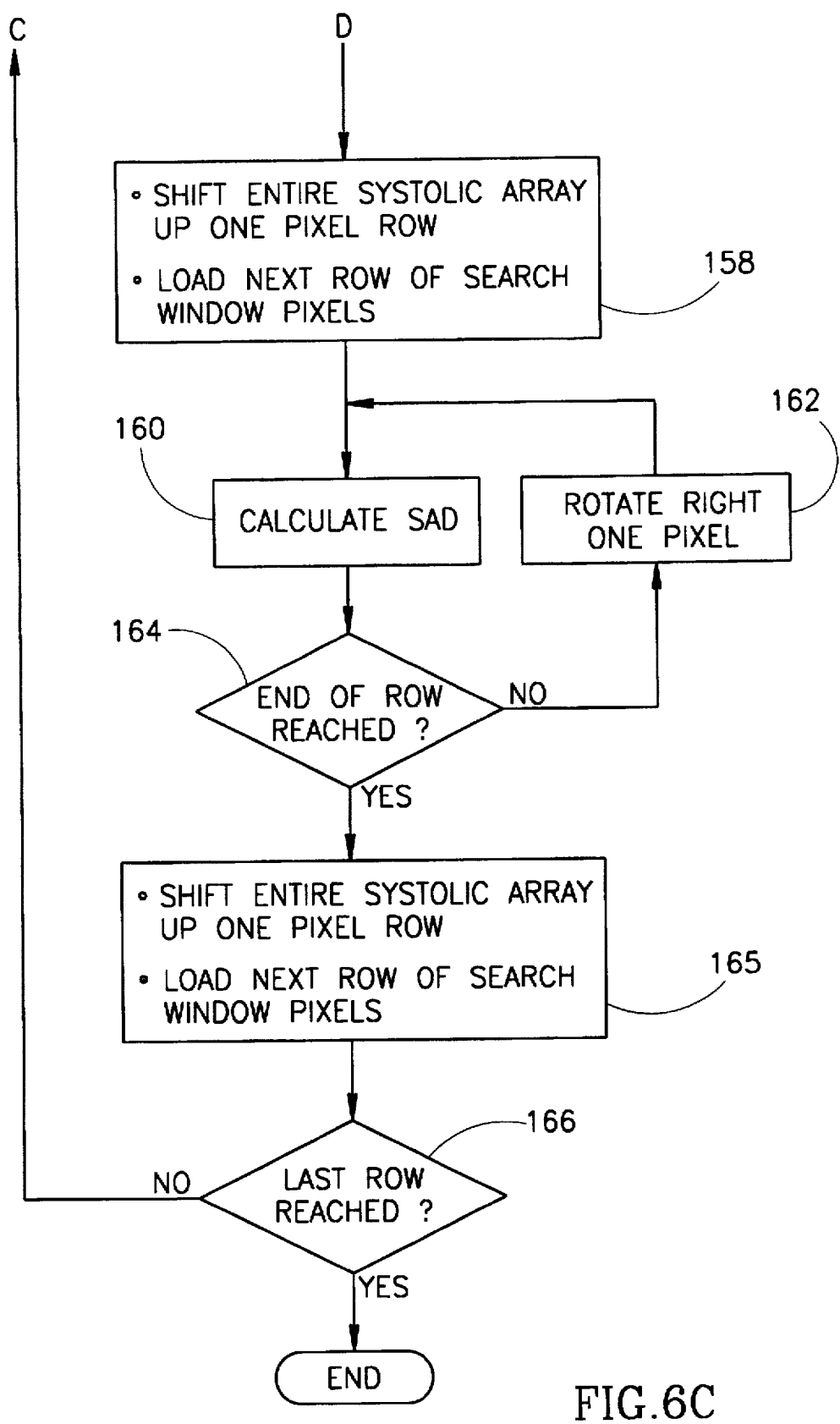

A high level flow diagram illustrating the method of performing the motion estimation search within the search window in an alternative embodiment of the present invention is shown in FIG. 6. The first step is to load the four template macro blocks 46, 48, 50, 52 with pixel data from memory holding the current frame (step 130). Next, the search array shifters 30, 32, 34, 36 in the processing elements 14, 16, 18, 20 and search array shifters 38, 40, 42, 44 in the FIFO arrays 22, 24, 26, 28 in the systolic array 12 (FIG. 2) are loaded with pixel data from the previous frame (i.e., the data that is to be searched) (step 132). The data that is loaded is indicated by the hatched LOAD #1 78 area in FIG. 5 and comprises the pixel data in columns 'a0' through 'h15' in block row A (i.e., rows A0 through A15). Once the search array shifters and the template macro blocks are loaded, the first SAD can be generated by the SAD generation units in the processing elements (step 134). Note that a SAD value is calculated only for four blocks, i.e., rows A0 through A15 and columns a0 through d15. After the SAD is calculated for all four template macro blocks, the data in the search array shifters in the systolic array is rotated left by one pixel (step 136). In this step, the pixels in the leftmost column of search array shifter 30 wrap around, i.e., are rotated left into the rightmost column in search array shifter 44 such that the data in the search array shifters, from left to right, represent the pixel data in rows A0 through A15 and columns a1, a2 ... h14, h15, a0.

Once the pixels are rotated, the SAD generation units calculate a SAD using the template macro block data and the data in rows A0 through A15 and columns a1 through e0. The SAD result in the current cycle is then compared to the current minimum SAD. If the currently generated SAD is less than the minimum, the current SAD is made the new minimum SAD. Once the second SAD calculation is complete, the data in the search array shifters is again rotated left one pixel so that the data in the search array shifters in the systolic array represents pixel data in columns a2, a3 ... h13, h14, a0, a1, read from left to right.

This entire process repeats until the data originally in the leftmost column of the search array shifter 38 reaches the leftmost column in search array shifter 30 signifying that the end of the current row has been reached (step 138). This occurs after 64 rotate and calculate cycles. At this point, the SAD has been calculated for the eight blocks row A column 'a' through 'h'. For each of the template macro blocks, four blocks have been processed. The left template macro block has been processed with the pixels in columns 'a' through 'e', the mid-left template macro block with the pixels in columns 'b' through 'f', the mid-right template macro block with the pixels in columns 'c' through 'g', the right template macro block with the pixels in columns 'd' through 'h'.

Once the end of the first row is reached, all the search array shifters are shifted up one pixel. Then a new row of pixels, row B0, is shifted into the search array shifters and the top row, row A0, is shifted out and discarded (step 140). Thus, the search array shifters contain, from left to right, the pixel data in rows A1 through B0 and columns e0, e1 ... h15, a0 ... e15.

The process then continues in similar fashion to the steps described above. The steps include first calculating the SAD for the data currently in the search array shifters within the processing elements, i.e., columns e0 through h15 (step 142). Then the search array shifters in the systolic array is rotated right by one pixel (step 144). The column of pixels in the rightmost column of search array shifter 44 is rotated to the leftmost column of search array shifter 30. At this point, the pixel data in the search array shifters represents rows A1 through B0 and columns d15, e0 ... h15, a0 ... d13, d14. The SAD is then calculated for columns d15 through e14. The steps of calculating the SAD and rotating right repeat until the end of the row is reached (step 146). At this point, the data in the search array shifters, from left to right, represent columns a0 through h15. The search window arrays are again shifted up one pixel and the data from row A1 is discarded and the data from row B1 is loaded into the search array shifters.

The process described above repeats until the last row, E15, is reached (step 148). The search window is traversed from left to right then down then right to left then down, etc. The last row, E15, is loaded at the point when the search array shifters in the processing elements contain data from columns a0 though d15. After 64 rotates to the left, the search array shifters are left with data from columns e0 through h15 and rows E0 through E15 which is overwritten with data during the second load. The second load of data, hatched LOAD #2 80 area in FIG. 7, comprises the eight blocks of pixel data. This data is loaded into the search array shifters 30, 32, 34, 36 in the processing elements and the search array shifters 38, 40, 42, 44 in the FIFOs (step 150).

The SAD is then calculated using search window pixel data in columns e0 through h15 in rows A0 through A15 (step 152). After the SAD is calculated, the data in the search array shifters are rotated to the left one pixel (step 154). These steps are repeated 64 times until the data in the search array shifters in the processing elements corresponds to the pixel data in columns i0 through l15. At the end of the first row of processing the left template macro block has been processed with the pixels in columns 'e' through 'i', the mid-left template macro block with the pixels in columns 'f' through 'j', the mid-right template macro block with the pixels in columns 'g' through 'k', the right template macro block with the pixels in columns 'h' through 'l'.

Once the end of the end of the first row of pixels is reached (step 156), all the search array shifters in the systolic array are shifted up one pixel, discarding the pixel data from row A0 (step 158). The pixel data in row B0 columns e0 through 115 is loaded into the search array shifters. The search array shifters in the processing elements now hold data corresponding to rows A1 through B0 and columns i0 through 115. The SAD is then calculated (step 160) and the search array shifters are rotated right one pixel (step 162). The steps of calculating the SAD and rotating right one pixel are repeated for 64 cycles until the end of row B0 is reached (step 164).

At this point, the pixel data from row A1 is discarded, the search array shifters are shifted up one pixel and the pixel data in row B1 is loaded into the search array shifters. The process of calculating and rotating continues in the direction of the large arrow adjacent to the LOAD #2 area in FIG. 7 until the last row, row E15, is reached (step 166). After the pixel data from row E15 is processed, the search array shifters in the processing elements are left holding pixel data from rows E0 through E15 columns i0 through 115.

Figure 10:
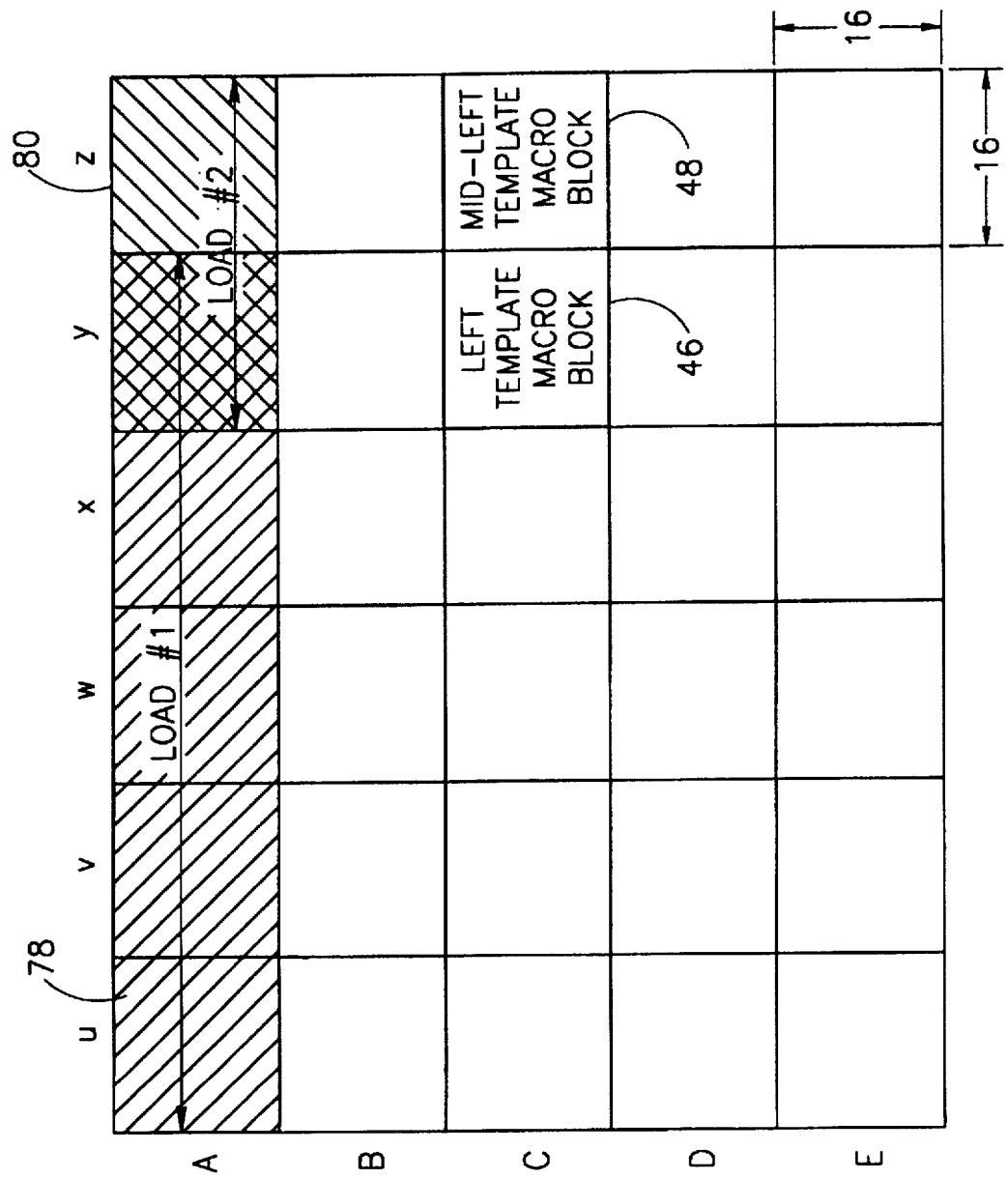
FIG. 10 illustrates two template macro blocks adjoining the right edge of the search window and the portions of the search window explicitly loaded into the search array shifters.
Figure 11:
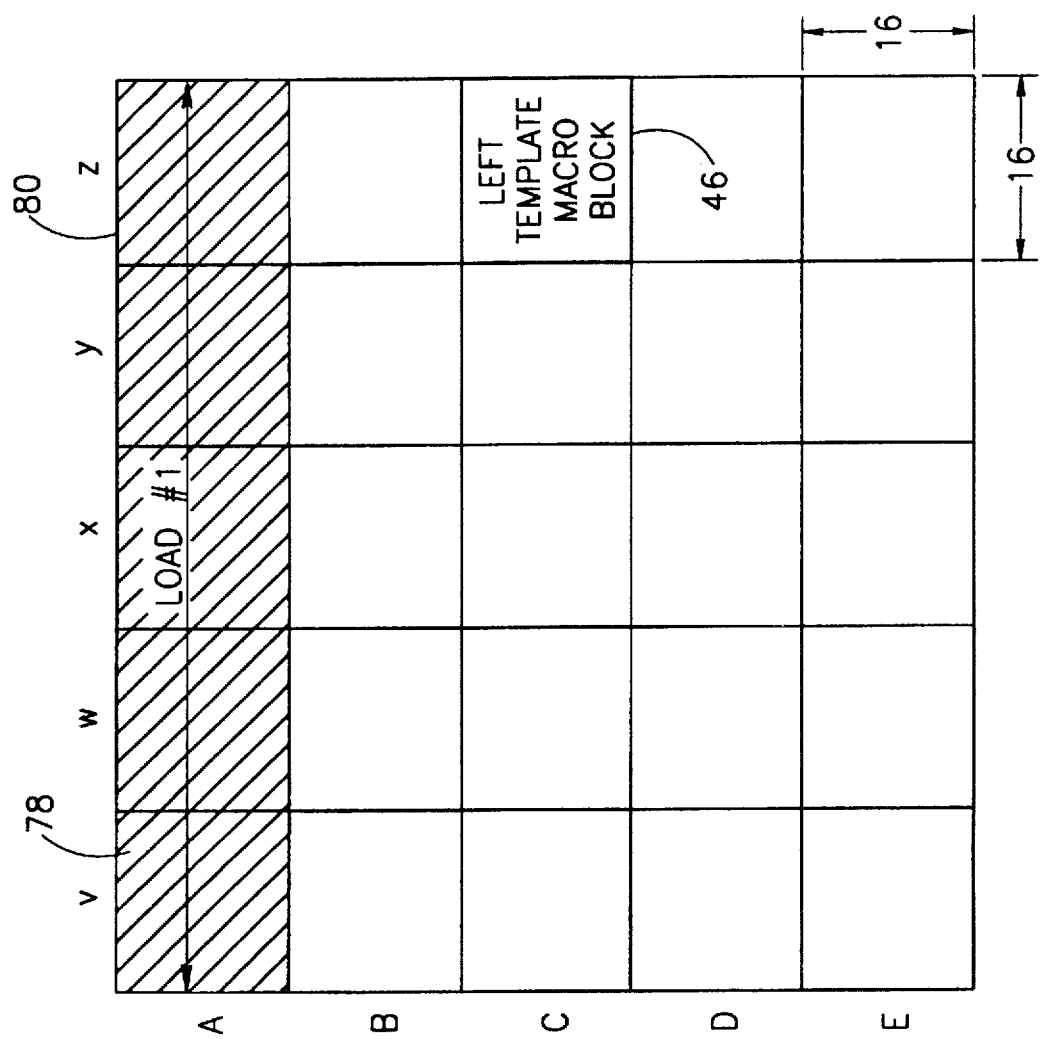
FIG. 11 illustrates one template macro block adjoining the right edge of the search window and the portions of the search window explicitly loaded into the search array shifters.

To further illustrate the search method of the present invention, a set of tables, Tables 1 through 6, is presented showing the contents of the eight search array shifters 30, 32, 34, 36, 38, 40, 42, 44 (FIG. 2) at particular cycles during the process. In addition, corresponding figures are provided that illustrate the relative position of the template macro blocks for each case. The tables and figures presented below are described within the context of the search method described in the flow diagram of FIG. 6. One skilled in the art, however, would be able to modify the tables below for the search method illustrated in FIG. 3. In addition, one skilled in the art could also generate similar tables for configurations with different numbers of processing elements and FIFO arrays. The six tables presented below correspond to the following six cases:

1. four template macro blocks (TMBs) during a normal search (Table 1/FIG. 5)
2. four TMBs adjoining the left edge of the search window (Table 2/FIG. 7)
3. four TMBs adjoining the right edge of the search window (Table 3/FIG. 8)
4. three TMBs adjoining the right edge of the search window (Table 4/FIG. 9)
5. two TMBs adjoining the right edge of the search window (Table 5/FIG. 10)
6. one TMBs adjoining the right edge of the search window (Table 6/FIG. 11)

Table 1 below is for the case during normal non-edge searching.

the search method after LOAD #2. The Down indicates that the search is first carried out in the downward direction and after reaching the bottom row. Subsequently, LOAD #2 occurs and the search continues in the downward direction until the bottom row is reached again. The Cycle Left column represents the current cycle count in the left direction. In the right direction the cycle count is represented in the Cycle Right column. The lower case letters indicate the column the data in the search array shifters came from. There are eight columns of data, each representing the data in one search array shifter. The position of the four template macro blocks in relation to the search window is shown in FIG. 5.

With reference to Table 1 and FIG. 5, initially after LOAD #1, at cycle 0, the search array shifters contain pixel data located in the upper most rows of columns a . . . h. After 16 clock cycles, the data in the shifters has been rotated 16 times to the left such that the data in the shifters corresponds to the data in columns b . . . h, a. After another 16 clock cycles the data in the shifters has been rotated 32 times to the left such that the data in the shifters corresponds to the data in columns c . . . h, a . . . b. This process continues until 64 clock cycles have occurred. The data in the shifters has now been rotated 64 times to the left such that the data in the shifters corresponds to the data in columns e . . . h, a . . . d. At this point, the direction of rotation reverses to the right and the search continues in the downward direction. After 16 clock cycles, the data in the shifters has been rotated 16 times to the right such that the data in the shifters corresponds to the data in columns d . . . h, a . . . c. The process continues until after 64 clock cycles, the data in the shifters corresponds to the data in columns a . . . h. This zigzag search pattern continues until the last row in the search window is reached whereby the direction of the search continues from the top of the search window in the downward direction after LOAD #2 is performed.

Once LOAD #2 occurs, the search continues in the downward direction in similar fashion to before. This time, however, the pixel data search array shifters corresponds to the data in columns e . . . l. After every 16 clock cycles, the data in the shifters is rotated by an amount corresponding to one block column. After 64 clock cycles, the data in the shifters corresponds to the data in columns i . . . l, e . . . h. The search ends when the bottom row is reached once again.

The search data flow for the case when the template macro blocks are adjoining the left edge of the search window is presented in Table 2 below with reference to FIG. 7.

TABLE 1

Non-Edge Search Shifter Data Flow

| Search Direction | Cycle | | Search Array Shifter | | | | | | | |
|---|---|---|---|---|---|---|---|---|---|---|
| | Left | Right | 30 | 32 | 34 | 36 | 38 | 40 | 42 | 44 |
| LOAD #1 | 0 | 64 | a | b | c | d | e | f | g | h |
| Down | 16 | 48 | b | c | d | e | f | g | h | a |
| | 32 | 32 | c | d | e | f | g | h | a | b |
| | 48 | 16 | d | e | f | g | h | a | b | c |
| | 64 | 0 | e | f | g | h | a | b | c | d |
| LOAD #2 | 0 | 64 | e | f | g | h | i | j | k | l |
| Down | 16 | 48 | f | g | h | i | j | k | l | e |
| | 32 | 32 | g | h | i | j | k | l | e | f |
| | 48 | 16 | h | i | j | k | l | e | f | g |
| | 64 | 0 | i | j | k | l | e | f | g | h |

The table is split into two sections: a section describing the search method after LOAD #1 and a section describing

TABLE 2

Left Edge Search Shifter Data Flow

| Search Direction | Cycle | | Search Array Shifter | | | | | | | |
|---|---|---|---|---|---|---|---|---|---|---|
| | Left | Right | 30 | 32 | 34 | 36 | 38 | 40 | 42 | 44 |
| LOAD #1 | 0 | 64 | | | | a | b | c | d | e |
| Down | 16 | 48 | | | a | b | c | d | e | |
| | 32 | 32 | | a | b | c | d | e | | |
| | 48 | 16 | a | b | c | d | e | | | |
| | 64 | 0 | b | c | d | e | | | | a |
| LOAD #2 | 0 | 64 | b | c | d | e | f | g | h | |
| Down | 16 | 48 | c | d | e | f | g | h | | b |
| | 32 | 32 | d | e | f | g | h | | b | c |
| | 48 | 16 | e | f | g | h | | b | c | d |
| | 64 | 0 | f | g | h | | b | c | d | e |

Figure 7:
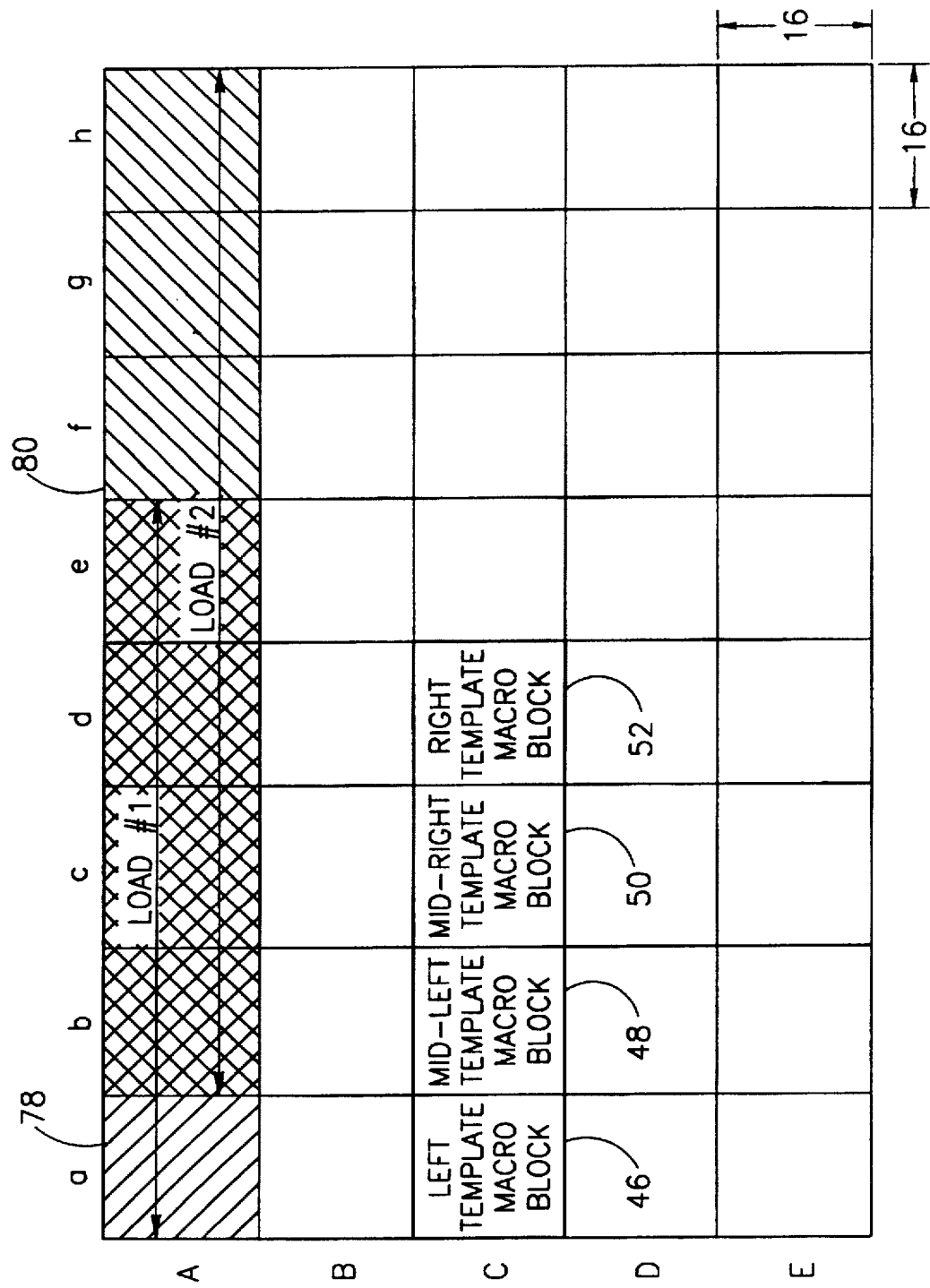
FIG. 7 illustrates four template macro blocks adjoining the left edge of the search window and the portions of the search window explicitly loaded into the search array shifters.

FIG. 7 illustrates the location of the four template macro blocks in relation to the search window. If template macro blocks are loaded four blocks at a time starting from the left, then the scenario shown in FIG. 7 is the only possible left edge case. The search method of Table 2 is similar to that of Table 1 except for which columns of pixels are loaded during LOAD #1 78 and LOAD #2 80. Since the left template macro block 46 is adjoining the left edge of the search window, there is less of an area that needs to be searched. The left template macro block 46 needs to be processed with column 'a' only (the four columns to the right, b ... e, are processed during the LOAD #2 cycle); the mid-left template macro block 48 with columns a, b; the mid-right template macro block 50 with columns a ... c; and the right template macro block 52 with columns a ... d. To accomplish this, data in columns a ... d are loaded during LOAD #1 into search array shifters 36, 38, 40, 42, respectively. After 64 cycles all the template macro blocks have been processed accordingly.

For the LOAD #2 cycle, the left template macro block needs to be processed with columns b ... e; the mid-left template macro block with columns c ... f; the mid-right template macro block with columns d ... g; and the right template macro block with columns e ... h. To accomplish this, data in columns a ... h are loaded during LOAD #2 into the search array shifters. After 48 cycles all the template macro blocks have been processed accordingly.

The search data flow for the case when four template macro blocks are adjoining the right edge of the search window is presented in Table 3 below.

TABLE 3

Right Edge Search Shifter Data Flow -
4 TMBs Adjoin Right Edge

| Search Direction | Cycle | | Search Array Shifter | | | | | | |
|---|---|---|---|---|---|---|---|---|---|
| | Left | Right | 30 | 32 | 34 | 36 | 38 | 40 | 42 | 44 |
| LOAD #1 | 0 | 64 | s | t | u | v | w | x | y | z |
| Down | 16 | 48 | t | u | v | w | x | y | z | s |
| | 32 | 32 | u | v | w | x | y | z | s | t |
| | 48 | 16 | v | w | x | y | z | s | t | u |
| | 64 | 0 | w | x | y | z | s | t | u | v |
| LOAD #2 | 0 | 64 | w | x | y | z | | | | |
| Down | 16 | 48 | x | y | z | | | | | w |
| | 32 | 32 | y | z | | | | | w | x |
| | 48 | 16 | z | | | | | w | x | y |
| | 64 | 0 | | | | | w | x | y | z |

Figure 8:
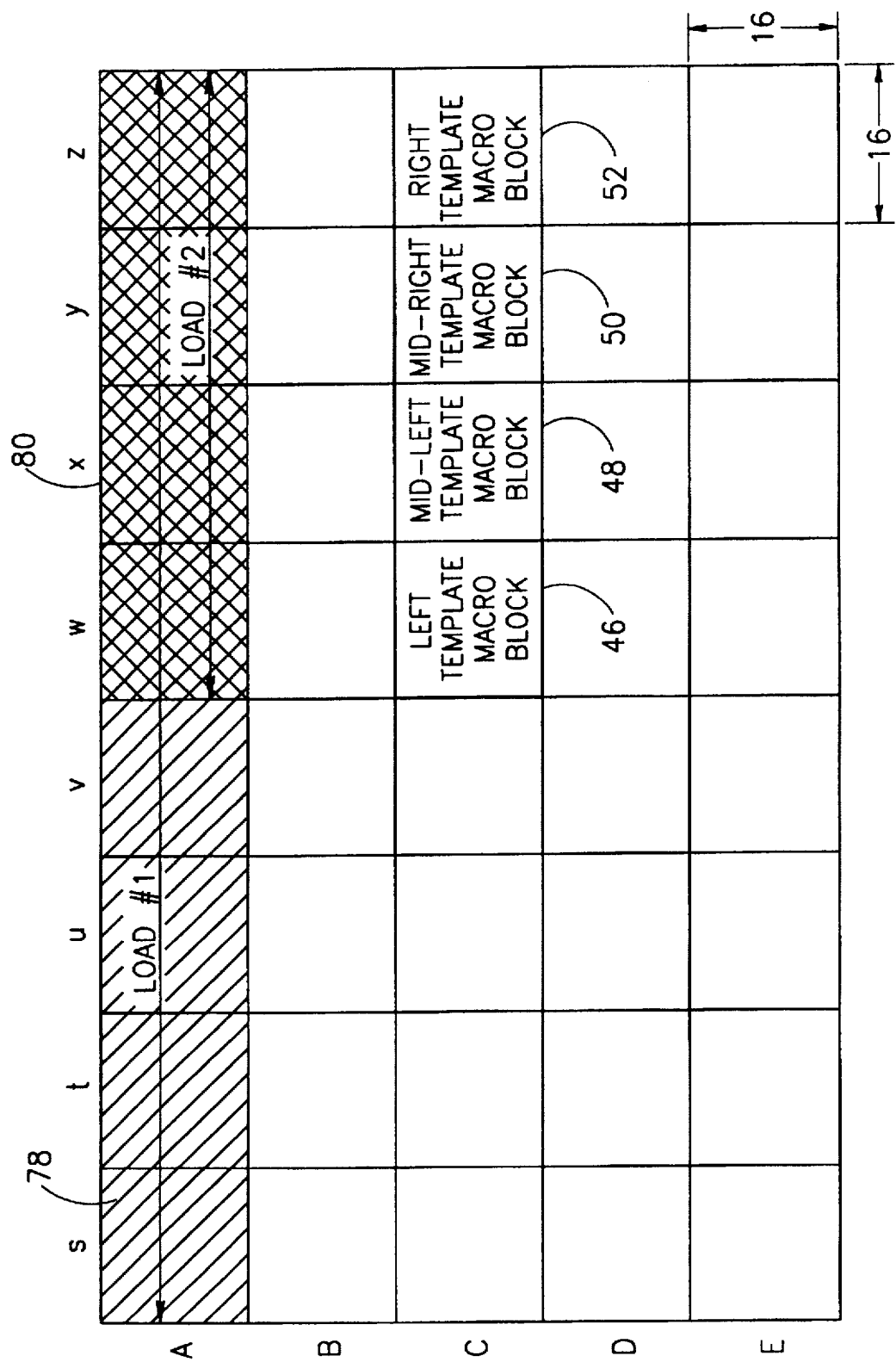
FIG. 8 illustrates four template macro blocks adjoining the right edge of the search window and the portions of the search window explicitly loaded into the search array shifters.

As shown in FIG. 8, the four template macro blocks, in this case, adjoin the right edge of the search window. The columns have been labeled with the eight last letters of the English alphabet to signify the columns at the right edge of the search window. The letters chosen are for illustration purposes only and does not imply that search windows can have only 26 columns. The method of the present invention can be applied to search windows of any size.

Thus, the columns s ... z represent the rightmost columns in the search window. For the LOAD #1 78 cycle, the left template macro block must to be processed with columns s ... v; the mid-left template macro block with columns t ... w; the mid-right template macro block with columns u ... x; and the right template macro block with columns v ... y. To accomplish this, data in columns s ... z are loaded during LOAD #1 into the search array shifters. After 64 cycles all the template macro blocks have been processed accordingly.

The LOAD #2 cycle, however, needs to process less data in this case because the four columns of pixel data usually present to the right of the template macro blocks is not present.

Thus, for the LOAD #2 80 cycle, the left template macro block must to be processed only with columns w ... z; the mid-left template macro block with columns x ... z; the mid-right template macro block with columns y, z; and the right template macro block with column 'z' only. To accomplish this, data in columns w ... z are loaded during LOAD #2 into the search array shifters 30, 32, 34, 36, respectively. After 64 cycles all the template macro blocks have been processed accordingly.

TABLE 4

Right Edge Search Shifter Data Flow -
3 TMBs Adjoin Right Edge

| Search Direction | Cycle | | Search Array Shifter | | | | | | |
|---|---|---|---|---|---|---|---|---|---|
| | Left | Right | 30 | 32 | 34 | 36 | 38 | 40 | 42 | 44 |
| LOAD #1 | 0 | 64 | t | u | v | w | x | y | | |
| Down | 16 | 48 | u | v | w | x | y | | | t |
| | 32 | 32 | v | w | x | y | | | t | u |
| | 48 | 16 | w | x | y | | | t | u | v |
| | 64 | 0 | x | y | | | t | u | v | w |
| LOAD #2 | 0 | 64 | x | y | z | | | | | |
| Down | 16 | 48 | y | z | | | | | | x |
| | 32 | 32 | z | | | | | | x | y |
| | 48 | 16 | | | | | | | | |
| | 64 | 0 | | | | | | | | |

Figure 9:
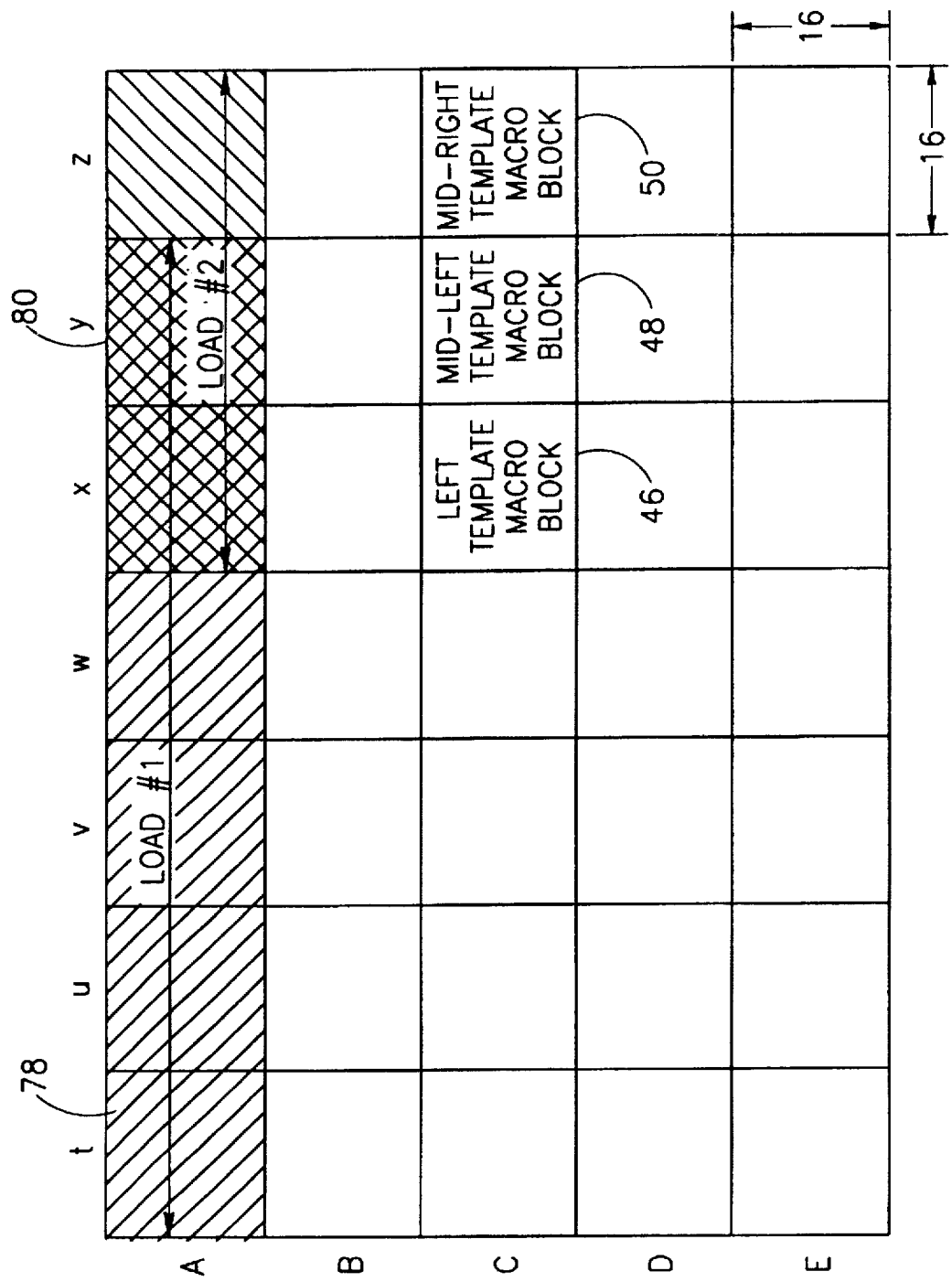
FIG. 9 illustrates three template macro blocks adjoining the right edge of the search window and the portions of the search window explicitly loaded into the search array shifters.

With reference to FIG. 9, in this case, only three template macro blocks are required for processing: the left 46, mid-left 48 and mid-right 50 template macro blocks. As in the previous case, the template macro blocks adjoin the right edge of the search window. Since there are only three template macro blocks, only seven columns of pixel data, rather than eight, are processed. Thus, the search window in FIG. 9 comprises only seven columns t ... z.

For the LOAD #1 78 cycle, the left template macro block must to be processed with columns t ... w; the mid-left template macro block with columns u ... x; and the mid-right template macro block with columns v ... y. To accomplish this, data in columns t ... y are loaded during LOAD #1 into the search array shifters 30, 32, 34, 36, 38, 40, respectively. After 64 cycles all the template macro blocks have been processed accordingly.

During the LOAD #2 cycle, however, less data needs to be processed in this case because the four columns of pixel data usually present to the right of the template macro blocks are not present. In addition, there are only three template macro blocks. Thus, for the LOAD #2 80 cycle, the left template macro block must to be processed only with columns x ... z; the mid-left template macro block with columns y, z; and the mid-right template macro block with column 'z' only. To accomplish this, data in columns x ... z are loaded during LOAD #2 into the search array shifters 30, 32, 34, respectively. After 48 cycles all the template macro blocks have been processed accordingly.

TABLE 5

Right Edge Search Shifter Data Flow -
2 TMBs Adjoin Right Edge

| Search Direction | Cycle | | Search Array Shifter | | | | | | |
|---|---|---|---|---|---|---|---|---|---|
| | Left | Right | 30 | 32 | 34 | 36 | 38 | 40 | 42 | 44 |
| LOAD #1 | 0 | 64 | u | v | w | x | y | | | |
| Down | 16 | 48 | v | w | x | y | | | | u |
| | 32 | 32 | w | x | y | | | | u | v |

TABLE 5-continued

Right Edge Search Shifter Data Flow -
2 TMBs Adjoin Right Edge

| Search Direction | Cycle | | Search Array Shifter | | | | | | | |
|---|---|---|---|---|---|---|---|---|---|---|
| | Left | Right | 30 | 32 | 34 | 36 | 38 | 40 | 42 | 44 |
| | 48 | 16 | x | y | | | | u | v | w |
| | 64 | 0 | y | | | | u | v | w | x |
| LOAD #2 | 0 | 64 | y | z | | | | | | |
| Down | 16 | 48 | z | | | | | | | y |
| | 32 | 32 | | | | | | | | |
| | 48 | 16 | | | | | | | | |
| | 64 | 0 | | | | | | | | |

With reference to FIG. 10 this case requires only two template macro blocks for processing: the left 46 and mid-left 48 template macro blocks. As in the previous case, the template macro blocks adjoin the right edge of the search window. Since there are only two template macro blocks, only six columns of pixel data, rather than eight, are processed. Thus, the search window in FIG. 10 comprises only six columns u . . . z.

For the LOAD #1 78 cycle, the left template macro block must to be processed with columns u . . . x and the mid-left template macro block with columns v . . . y. To accomplish this, data in columns u . . . y are loaded during LOAD #1 into the search array shifters 30, 32, 34, 36, 38, respectively. After 64 cycles all the template macro blocks have been processed accordingly.

During the LOAD #2 cycle, however, less data needs to be processed in this case because the four columns of pixel data usually present to the right of the template macro blocks are not present. In addition, there are only two template macro blocks. Thus, for the LOAD #2 80 cycle, the left template macro block must to be processed only with columns y, z and the mid-left template macro block with column 'z' only. To accomplish this, data in columns y, z are loaded during LOAD #2 into the search array shifters 30, 32, respectively. After 32 cycles all the template macro blocks have been processed accordingly.

TABLE 6

Right Edge Search Shifter Data Flow -
1 TMB Adjoins Right Edge

| Search Direction | Cycle | | Search Array Shifter | | | | | | | |
|---|---|---|---|---|---|---|---|---|---|---|
| | Left | Right | 30 | 32 | 34 | 36 | 38 | 40 | 42 | 44 |
| LOAD #1 | 0 | 64 | v | w | x | y | z | | | |
| Down | 16 | 48 | w | x | y | z | | | | v |
| | 32 | 24 | x | y | z | | | | v | w |
| | 48 | 16 | y | z | | | | v | w | x |
| | 64 | 0 | z | | | | | v | w | x | y |

With reference to FIG. 11 this case requires only one template macro block for processing: the left template macro block 46. As in the previous case, the single template macro block adjoins the right edge of the search window. Since there is only one template macro block, only five columns of pixel data, rather than eight, are processed. Thus, the search window in FIG. 11 comprises only five columns v . . . z. In addition, this case required only one load.

For the LOAD #1 78 cycle, the left template macro block must to be processed with columns v . . . z. To accomplish this, data in columns v . . . z are loaded during LOAD #1 into the search array shifters 30, 32, 34, 36, respectively. After 64 cycles all the template macro blocks have been processed accordingly.

While the invention has been described with respect to a limited number of embodiments, it will be appreciated that many variations, modifications and other applications of the invention may be made.

What is claimed is:

1. An apparatus for reducing memory bandwidth required to process data within a search window against predefined template data, comprising:

a plurality of processing elements, each processing element comprising:

a first search array shifter, said first search array shifter holding a block of data from said search window, said first search array shifter able to rotate its contents left and right and shift its contents up;

a template block for holding a block of said predefined template data;

function means coupled to said first search array shifter and to said template block, said function means for calculating a predetermined function based on the contents of said first search array shifter and said template block;

a plurality of first in first out arrays (FIFOs), each FIFO comprising a second search array shifter, said second search array shifter holding a block of data from said search window, said second search array shifter able to rotate its contents left and right and shift its contents up;

wherein said plurality of processing elements and said plurality of FIFOs are arranged adjacent one another in a linear array such that each first and second search array shifter is coupled to its left and right neighbor, search array shifters on either end of said linear array coupled to each other;

wherein said search window data is shifted through said first and second search array shifters, on each successive shift said function means calculating said predetermined function; and wherein said search window is searched bidirectionally on a row by row basis whereby data within each row in said search window is rotated horizontally through said first and second search array shifters, at the end of each row, data in said first and second search array shifters is shifted vertically.

2. The apparatus according to claim 1, further comprising an upper buffer coupled to said first and second search array shifters and to said search window, said upper buffer for buffering the contents of said search window.

3. The apparatus according to claim 1, further comprising a lower buffer coupled to said first and second search array shifters and to said search window, said lower buffer for buffering the contents of said search window.

4. The apparatus according to claim 1, wherein said function means comprises a sum of the absolute difference generation unit.

5. The apparatus according to claim 1, wherein each of said first and second search array shifters comprises an array having dimensions 16×16, each said array containing data from said search window.

6. The apparatus according to claim 1, wherein each of said template blocks comprises an array having dimensions 16×16, each said array containing template data.

7. An apparatus for reducing memory bandwidth required to process data within a search window against predefined template data, comprising:

a plurality of processing elements, each processing element comprising:

a first search array shifter, said first search array shifter holding a block of data from said search window, said first search array shifter able to rotate its contents left and right and shift its contents up and down;

a template block for holding a block of said predefined template data;

function means coupled to said first search array shifter and to said template block, said function means for calculating a predetermined function based on the contents of said first search array shifter and said template block;

a plurality of first in first out arrays (FIFOs), each FIFO comprising a second search array shifter, said second search array shifter holding a block of data from said search window, said second search array shifter able to rotate its contents left and right and shift its contents up and down;

wherein said plurality of processing elements and said plurality of FIFOs are arranged adjacent one another in a linear array such that each first and second search array shifter is coupled to its left and right neighbor, search array shifters on either end of said linear array coupled to each other;

wherein said search window data is shifted through said first and second search array shifters, on each successive shift said function means calculating said predetermined function; and wherein said search window is searched bidirectionally on a row by row basis whereby data within each row in said search window is rotated horizontally through said first and second search array shifters, at the end of each row, data in said first and second search array shifters is shifted vertically.

8. The apparatus according to claim 7, further comprising an upper buffer coupled to said first and second search array shifters and to said search window, said upper buffer for buffering the contents of said search window.

9. The apparatus according to claim 7, further comprising a lower buffer coupled to said first and second search array shifters and to said search window, said lower buffer for buffering the contents of said search window.

10. The apparatus according to claim 7, wherein said function means comprises a sum of the absolute difference generation unit.

11. The apparatus according to claim 7, wherein each of said first and second search array shifters comprises an array having dimensions 16×16, each said array containing data from said search window.

12. The apparatus according to claim 7, wherein each of said template blocks comprises an array having dimensions 16×16, each said array containing template data.

13. A method of processing data within a search window against predefined template data, said method for use in a processing array comprising template array means for storing said template data and search array shifter means, wider than the width of said template array means, for storing a portion of data from said search window, said processing array including calculating a value which is a function of said template data and said search window data, said method comprising the steps of:

loading said template array means with said template data;

loading said search array shifter means with a first load of said search window data;

repeating the following steps until the last row of said search window is reached:

calculating said function and rotating the data within said search array shifter means one position to the left, repeating this step of calculating and rotating until the end of the current row of data is reached;

shifting said search array shifter means up one position and loading the next row of data from said search window;

calculating said function and rotating said search array shifter means one position to the right, repeating this step of calculating and rotating until the end of the current row of data is reached; and shifting said search array shifter means up one position and loading the next row of data from said search window.

* * * * *